United States Patent
Crowe et al.

(10) Patent No.: US 8,301,557 B1
(45) Date of Patent: *Oct. 30, 2012

(54) SYSTEM, PROGRAM PRODUCT, AND METHOD TO AUTHORIZED DRAW FOR RETAILER OPTIMIZATION

(75) Inventors: Andrew B. Crowe, Omaha, NE (US);
Scott H. Galit, New York, NY (US);
Trent Sorbe, Brookings, SD (US)

(73) Assignee: Metabank, Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,950

(22) Filed: May 28, 2012

Related U.S. Application Data

(63) Continuation of application No. 13/349,423, filed on Jan. 12, 2012, now Pat. No. 8,190,480, which is a continuation of application No. 13/233,268, filed on Sep. 15, 2011, now Pat. No. 8,103,549, which is a continuation of application No. 12/417,199, filed on Apr. 2, 2009, now Pat. No. 8,065,187.

(60) Provisional application No. 61/042,612, filed on Apr. 4, 2008, provisional application No. 61/042,624, filed on Apr. 4, 2008.

(51) Int. Cl.
*G06Q 40/00* (2006.01)
(52) U.S. Cl. .................. 705/38; 705/39; 705/40
(58) Field of Classification Search .............. 705/17, 705/38, 39, 40, 41, 35
See application file for complete search history.

(56) References Cited

U.S. PATENT DOCUMENTS

| | | | |
|---|---|---|---|
| 3,752,904 | A | 8/1973 | Waterbury |
| 4,247,759 | A | 1/1981 | Yuris et al. |
| 4,334,307 | A | 6/1982 | Bourgeois et al. |
| 4,439,636 | A | 3/1984 | Newkirk et al. |
| 4,449,040 | A | 5/1984 | Matsuoka et al. |
| 4,528,643 | A | 7/1985 | Freeny, Jr. |

(Continued)

FOREIGN PATENT DOCUMENTS

EP    0397512    11/1990

(Continued)

OTHER PUBLICATIONS

David Lazarus. (Oct. 6, 2004). 120% Rate for Wells' Advances. San Francisco Chronicle, San Francisco, California, p. C1.*

(Continued)

*Primary Examiner* — Matthew S Gart
*Assistant Examiner* — Olusegun Goyea
(74) *Attorney, Agent, or Firm* — Bracewell & Giuliani, LLP

(57) ABSTRACT

A line of credit optimized for a retailer and attached to a customer account at a financial institution is established for a customer of the retailer. A financial institution computer determines whether to advance funds through the line of credit for a transaction, then advances funds in one or more preselected loan increments to the customer account, up to a total available line of credit for the customer. The financial institution computer decrements the total available line of credit by the amount provided for the customer transaction and by a predetermined customer fee for each of the loan increments. The computer determines a value of a retailer foe to be paid by the retailer, involving a predetermined amount for each of the loan increments. The customer fee amount can be zero or discounted for customer transactions with the retailer. The retailer fee can be a rebate to the customer.

20 Claims, 12 Drawing Sheets

U.S. PATENT DOCUMENTS

| | | | |
|---|---|---|---|
| 4,532,416 A | 7/1985 | Berstein | |
| 4,577,061 A | 3/1986 | Katzeff et al. | |
| 4,625,276 A | 11/1986 | Benton et al. | |
| 4,677,565 A | 6/1987 | Ogaki et al. | |
| 4,678,895 A | 7/1987 | Tateisi et al. | |
| 4,706,275 A | 11/1987 | Kamil | |
| 4,722,054 A | 1/1988 | Yorozu et al. | |
| 4,727,243 A | 2/1988 | Savar | |
| 4,750,201 A | 6/1988 | Hodgson et al. | |
| 4,797,540 A | 1/1989 | Kimizu | |
| 4,827,113 A | 5/1989 | Rikuna | |
| 4,868,900 A | 9/1989 | McGuire | |
| 4,877,947 A | 10/1989 | Mori | |
| 4,879,744 A | 11/1989 | Tasaki et al. | |
| 4,884,212 A | 11/1989 | Stutsman | |
| 4,951,308 A | 8/1990 | Bishop et al. | |
| 4,968,873 A | 11/1990 | Dethloff et al. | |
| 5,012,077 A | 4/1991 | Takano | |
| 5,048,085 A | 9/1991 | Abraham et al. | |
| 5,050,207 A | 9/1991 | Hitchcock | |
| 5,068,891 A | 11/1991 | Marshall | |
| 5,101,098 A | 3/1992 | Naito | |
| 5,138,650 A | 8/1992 | Stahl et al. | |
| 5,146,067 A | 9/1992 | Sloan et al. | |
| 5,148,481 A | 9/1992 | Abraham et al. | |
| 5,155,342 A | 10/1992 | Urano | |
| 5,163,086 A | 11/1992 | Ahearn et al. | |
| 5,192,947 A | 3/1993 | Neustein | |
| 5,220,593 A | 6/1993 | Zicker et al. | |
| 5,221,838 A | 6/1993 | Gutman et al. | |
| 5,225,666 A | 7/1993 | Amarena et al. | |
| 5,264,689 A | 11/1993 | Maes et al. | |
| 5,265,155 A | 11/1993 | Castro | |
| 5,266,782 A | 11/1993 | Alanara et al. | |
| 5,272,320 A | 12/1993 | Hakamada | |
| 5,278,752 A | 1/1994 | Narita et al. | |
| 5,285,382 A | 2/1994 | Muehlberger et al. | |
| 5,327,482 A | 7/1994 | Yamamoto | |
| 5,334,821 A | 8/1994 | Campo et al. | |
| 5,340,969 A | 8/1994 | Cox | |
| 5,352,876 A | 10/1994 | Watanabe et al. | |
| 5,359,182 A | 10/1994 | Schilling | |
| 5,409,092 A | 4/1995 | Itako et al. | |
| 5,416,306 A | 5/1995 | Imahata | |
| 5,438,186 A | 8/1995 | Nair et al. | |
| 5,442,567 A | 8/1995 | Small | |
| 5,448,044 A | 9/1995 | Price et al. | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,550,358 A | 8/1996 | Tait et al. | |
| 5,577,109 A | 11/1996 | Stimson et al. | |
| 5,577,112 A | 11/1996 | Cambray et al. | |
| 5,661,254 A | 8/1997 | Steuer et al. | |
| 5,696,908 A | 12/1997 | Muehlberger et al. | |
| 5,699,528 A | 12/1997 | Hogan | |
| 5,732,136 A | 3/1998 | Murphree et al. | |
| 5,814,798 A | 9/1998 | Zancho | |
| 5,841,365 A | 11/1998 | Rimkus | |
| 5,859,419 A | 1/1999 | Wynn | |
| 5,875,437 A | 2/1999 | Atkins | |
| 5,878,141 A | 3/1999 | Daly et al. | |
| 5,893,907 A | 4/1999 | Ukuda | |
| 5,897,620 A | 4/1999 | Walker et al. | |
| 5,920,848 A | 7/1999 | Schutzer et al. | |
| 5,923,016 A | 7/1999 | Fredregill et al. | |
| 5,933,812 A | 8/1999 | Meyer et al. | |
| 5,963,921 A | 10/1999 | Longfield | |
| 6,000,608 A | 12/1999 | Dorf | |
| 6,012,635 A * | 1/2000 | Shimada et al. | 235/380 |
| 6,021,397 A | 2/2000 | Jones et al. | |
| 6,032,859 A | 3/2000 | Muehlberger et al. | |
| 6,041,308 A | 3/2000 | Walker et al. | |
| 6,065,679 A | 5/2000 | Levie et al. | |
| 6,112,191 A | 8/2000 | Burke | |
| 6,144,948 A | 11/2000 | Walker et al. | |
| 6,154,738 A | 11/2000 | Call | |
| 6,189,787 B1 | 2/2001 | Dorf | |
| 6,208,978 B1 | 3/2001 | Walker et al. | |
| 6,249,773 B1 | 6/2001 | Allard et al. | |
| 6,253,998 B1 | 7/2001 | Ziarno | |
| 6,304,860 B1 | 10/2001 | Martin, Jr. et al. | |
| 6,467,684 B2 | 10/2002 | Fite et al. | |
| 6,704,714 B1 | 3/2004 | O'Leary et al. | |
| 6,739,506 B1 | 5/2004 | Constantine | |
| 6,865,544 B1 | 3/2005 | Austin | |
| 6,999,943 B1 | 2/2006 | Johnson et al. | |
| 7,010,507 B1 | 3/2006 | Anderson et al. | |
| 7,031,939 B1 | 4/2006 | Gallagher et al. | |
| 7,072,862 B1 | 7/2006 | Wilson | |
| 7,127,452 B1 | 10/2006 | Yashiro | |
| 7,177,829 B1 | 2/2007 | Wilson et al. | |
| 7,206,761 B2 | 4/2007 | Colvin | |
| 7,252,223 B2 | 8/2007 | Schofield | |
| 7,258,273 B2 | 8/2007 | Griffin | |
| 7,398,919 B2 | 7/2008 | Cooper | |
| 7,426,492 B1 | 9/2008 | Bishop et al. | |
| 7,451,920 B1 | 11/2008 | Rose | |
| 7,509,286 B1 | 3/2009 | Bent et al. | |
| 7,546,945 B1 | 6/2009 | Bucci et al. | |
| 7,567,936 B1 | 7/2009 | Peckover et al. | |
| 7,606,918 B2 | 10/2009 | Holzman et al. | |
| 7,607,570 B1 | 10/2009 | Constantine | |
| 7,628,319 B2 | 12/2009 | Brown | |
| 7,653,591 B1 * | 1/2010 | Dabney | 705/38 |
| 7,702,583 B1 | 4/2010 | Hamilton et al. | |
| 7,702,587 B2 | 4/2010 | Nguyen et al. | |
| 7,757,944 B2 | 7/2010 | Cline et al. | |
| 7,783,571 B2 | 8/2010 | Fish et al. | |
| 7,792,717 B1 | 9/2010 | Hankins et al. | |
| 7,810,735 B2 | 10/2010 | Madani | |
| 7,813,955 B2 | 10/2010 | Ariff et al. | |
| 7,814,012 B2 * | 10/2010 | Johnson | 705/40 |
| 7,865,434 B2 | 1/2011 | Sheets | |
| 7,899,750 B1 | 3/2011 | Klieman et al. | |
| 7,904,333 B1 | 3/2011 | Perkowski | |
| 7,933,833 B2 * | 4/2011 | Hotz et al. | 705/38 |
| 7,954,704 B1 | 6/2011 | Gephart et al. | |
| 8,046,256 B2 | 10/2011 | Chien et al. | |
| 8,051,006 B1 | 11/2011 | Rourk | |
| 2001/0021925 A1 | 9/2001 | Ukigawa et al. | |
| 2001/0034676 A1 | 10/2001 | Vasic | |
| 2001/0042785 A1 | 11/2001 | Walker et al. | |
| 2002/0002075 A1 | 1/2002 | Rowe | |
| 2002/0032612 A1 | 3/2002 | Williams et al. | |
| 2002/0077971 A1 | 6/2002 | Allred | |
| 2002/0152161 A1 | 10/2002 | Aoike | |
| 2002/0194122 A1 | 12/2002 | Knox et al. | |
| 2002/0194124 A1 | 12/2002 | Hobbs et al. | |
| 2003/0004997 A1 | 1/2003 | Parker et al. | |
| 2003/0055782 A1 | 3/2003 | Slater | |
| 2003/0061170 A1 * | 3/2003 | Uzo | 705/64 |
| 2003/0074311 A1 | 4/2003 | Saylors et al. | |
| 2003/0097331 A1 | 5/2003 | Cohen | |
| 2003/0135459 A1 | 7/2003 | Abelman et al. | |
| 2003/0144935 A1 | 7/2003 | Sobek | |
| 2003/0158811 A1 | 8/2003 | Sanders et al. | |
| 2003/0167225 A1 | 9/2003 | Adams | |
| 2003/0191702 A1 | 10/2003 | Hurley | |
| 2003/0191714 A1 | 10/2003 | Norris | |
| 2003/0197059 A1 | 10/2003 | Tidball et al. | |
| 2003/0200118 A1 * | 10/2003 | Lee et al. | 705/2 |
| 2003/0208443 A1 * | 11/2003 | Mersky | 705/40 |
| 2003/0217003 A1 | 11/2003 | Weinflash et al. | |
| 2004/0036215 A1 | 2/2004 | Butler | |
| 2004/0047459 A1 | 3/2004 | Diaz | |
| 2004/0098351 A1 | 5/2004 | Duke | |
| 2004/0111370 A1 | 6/2004 | Saylors et al. | |
| 2004/0117250 A1 | 6/2004 | Lubow et al. | |
| 2004/0117302 A1 | 6/2004 | Weichert et al. | |
| 2004/0133515 A1 | 7/2004 | McCoy et al. | |
| 2004/0143527 A1 | 7/2004 | Benkert et al. | |
| 2004/0148252 A1 | 7/2004 | Fleishman | |
| 2004/0153407 A1 | 8/2004 | Clubb et al. | |
| 2004/0199463 A1 | 10/2004 | Deggendorf | |
| 2004/0210484 A1 | 10/2004 | Lee | |

| | | | | | | |
|---|---|---|---|---|---|---|
| 2004/0211830 A1 | 10/2004 | Algiene | | 2008/0140568 A1* | 6/2008 | Henry .................... 705/40 |
| 2004/0215554 A1 | 10/2004 | Kemper et al. | | 2008/0162271 A1 | 7/2008 | Benjamin |
| 2004/0225545 A1 | 11/2004 | Turner et al. | | 2008/0210753 A1 | 9/2008 | Plozay et al. |
| 2004/0230523 A1* | 11/2004 | Johnson .................... 705/40 | | 2008/0228643 A1 | 9/2008 | Hall |
| 2004/0235542 A1 | 11/2004 | Stronach et al. | | 2008/0235095 A1 | 9/2008 | Oles et al. |
| 2004/0236646 A1 | 11/2004 | Wu et al. | | 2008/0270298 A1 | 10/2008 | McElroy et al. |
| 2005/0004839 A1 | 1/2005 | Bakker et al. | | 2008/0281734 A1 | 11/2008 | Longe et al. |
| 2005/0015332 A1 | 1/2005 | Chen | | 2008/0294977 A1 | 11/2008 | Friedman et al. |
| 2005/0021363 A1* | 1/2005 | Stimson et al. .................... 705/1 | | 2008/0301162 A1 | 12/2008 | Wall et al. |
| 2005/0075939 A1* | 4/2005 | Bao et al. .................... 705/26 | | 2009/0048963 A1 | 2/2009 | Bishop et al. |
| 2005/0082364 A1 | 4/2005 | Alvarez et al. | | 2009/0063297 A1 | 3/2009 | Dooley et al. |
| 2005/0108121 A1 | 5/2005 | Gravett et al. | | 2009/0063342 A1 | 3/2009 | Beckers |
| 2005/0167481 A1 | 8/2005 | Hansen et al. | | 2009/0063351 A1 | 3/2009 | Schmeyer et al. |
| 2005/0167487 A1 | 8/2005 | Conlon et al. | | 2009/0157220 A1 | 6/2009 | Walker |
| 2005/0173520 A1 | 8/2005 | Jaros et al. | | 2009/0164362 A1 | 6/2009 | Moore |
| 2005/0177489 A1 | 8/2005 | Neff et al. | | 2009/0164363 A1 | 6/2009 | Ahlers |
| 2005/0203837 A1 | 9/2005 | Leigh et al. | | 2009/0171775 A1 | 7/2009 | Cashion, Jr. et al. |
| 2005/0205663 A1 | 9/2005 | Algiene | | 2009/0192934 A1 | 7/2009 | Chu et al. |
| 2005/0228724 A1* | 10/2005 | Frangiosa .................... 705/26 | | 2009/0222367 A1 | 9/2009 | Jenkins et al. |
| 2005/0278188 A1 | 12/2005 | Thomson et al. | | 2009/0228307 A1 | 9/2009 | Sorbe |
| 2005/0278347 A1 | 12/2005 | Wolf et al. | | 2009/0254431 A1 | 10/2009 | Crowe et al. |
| 2005/0283436 A1* | 12/2005 | Greer et al. .................... 705/40 | | 2010/0030687 A1 | 2/2010 | Panthaki et al. |
| 2006/0059085 A1* | 3/2006 | Tucker .................... 705/38 | | 2010/0057554 A1 | 3/2010 | Lanford |
| 2006/0085269 A1 | 4/2006 | Guilfoyle | | 2010/0057609 A1 | 3/2010 | Sibson |
| 2006/0085334 A1 | 4/2006 | Murphy | | 2010/0076875 A1 | 3/2010 | Ernst et al. |
| 2006/0149665 A1 | 7/2006 | Weksler | | 2010/0106555 A1 | 4/2010 | Mneimneh |
| 2006/0149670 A1 | 7/2006 | Nguyen | | 2010/0222132 A1 | 9/2010 | Sanford et al. |
| 2006/0161499 A1 | 7/2006 | Rich et al. | | 2010/0280949 A1 | 11/2010 | Van Rensburg |
| 2006/0190322 A1* | 8/2006 | Oehlerking et al. ............ 705/14 | | 2010/0306104 A1* | 12/2010 | Johnson .................... 705/40 |
| 2006/0206402 A1 | 9/2006 | Sullivan | | 2010/0312684 A1 | 12/2010 | Kemper et al. |
| 2006/0212392 A1 | 9/2006 | Brown | | 2011/0047039 A1 | 2/2011 | Crames et al. |
| 2006/0212393 A1 | 9/2006 | Lindsay Brown | | 2011/0106698 A1 | 5/2011 | Isaacson et al. |
| 2006/0224502 A1 | 10/2006 | McGowan | | 2011/0270664 A1 | 11/2011 | Jones |
| 2006/0249570 A1 | 11/2006 | Seifert | | | | |
| 2006/0259957 A1 | 11/2006 | Tam et al. | | | FOREIGN PATENT DOCUMENTS | |
| 2006/0282356 A1* | 12/2006 | Andres et al. .................... 705/35 | | EP | 0619565 | 10/1994 |
| 2006/0282374 A1* | 12/2006 | Stone .................... 705/38 | | EP | 0348932 | 5/1995 |
| 2006/0293966 A1 | 12/2006 | Inouye | | JP | 2-238593 | 9/1990 |
| 2007/0000997 A1 | 1/2007 | Lambert et al. | | JP | 2-278495 | 11/1990 |
| 2007/0011089 A1 | 1/2007 | DeSchryver | | JP | 3-100791 | 4/1991 |
| 2007/0038515 A1 | 2/2007 | Postrel | | JP | 4-165588 | 6/1992 |
| 2007/0038924 A1 | 2/2007 | Beyer et al. | | KR | 2010010217 | 2/2010 |
| 2007/0045401 A1 | 3/2007 | Sturm | | WO | 86/02757 | 5/1986 |
| 2007/0061206 A1* | 3/2007 | LeFebvre .................... 705/14 | | WO | 86/07647 | 12/1986 |
| 2007/0083462 A1 | 4/2007 | Cubillo et al. | | WO | 88/03297 | 5/1988 |
| 2007/0087819 A1 | 4/2007 | Van Luchene et al. | | WO | 89/08899 | 9/1989 |
| 2007/0090183 A1 | 4/2007 | Hursta et al. | | WO | 91/09370 | 6/1991 |
| 2007/0100745 A1 | 5/2007 | Keiser et al. | | WO | 93/09515 | 5/1993 |
| 2007/0106603 A1 | 5/2007 | Whyte et al. | | WO | 94/10649 | 5/1994 |
| 2007/0136194 A1 | 6/2007 | Sloan | | WO | 94/28498 | 12/1994 |
| 2007/0152038 A1 | 7/2007 | Ciancio et al. | | WO | 95/03570 | 2/1995 |
| 2007/0168265 A1 | 7/2007 | Rosenberger | | WO | 97/46986 | 12/1997 |
| 2007/0174189 A1 | 7/2007 | Bishop et al. | | WO | 00/60487 | 10/2000 |
| 2007/0175984 A1 | 8/2007 | Khandaker et al. | | WO | 2007/133315 | 11/2007 |
| 2007/0198352 A1 | 8/2007 | Kannegiesser | | WO | 2008102329 | 8/2008 |
| 2007/0198354 A1 | 8/2007 | Senghore et al. | | ZA | 200709282 | 10/2007 |
| 2007/0198403 A1 | 8/2007 | Aloni et al. | | | | |
| 2007/0233596 A1 | 10/2007 | Ambrose | | | | |
| 2007/0244778 A1 | 10/2007 | Bailard | | | | |
| 2007/0250380 A1 | 10/2007 | Mankoff | | | | |
| 2007/0260536 A1 | 11/2007 | Stone | | | | |
| 2007/0262140 A1 | 11/2007 | Long, Sr. | | | | |
| 2007/0265957 A1 | 11/2007 | Advani et al. | | | | |
| 2007/0265960 A1 | 11/2007 | Advani et al. | | | | |
| 2007/0267479 A1 | 11/2007 | Nix et al. | | | | |
| 2007/0271178 A1 | 11/2007 | Davis et al. | | | | |
| 2007/0276736 A1 | 11/2007 | Guilfoyle | | | | |
| 2007/0282740 A1 | 12/2007 | Wendt | | | | |
| 2008/0005001 A1* | 1/2008 | Davis et al. .................... 705/35 | | | | |
| 2008/0021772 A1 | 1/2008 | Aloni et al. | | | | |
| 2008/0040261 A1 | 2/2008 | Nix et al. | | | | |
| 2008/0040265 A1 | 2/2008 | Rackley et al. | | | | |
| 2008/0052189 A1 | 2/2008 | Walker | | | | |
| 2008/0059363 A1* | 3/2008 | Hotz et al. .................... 705/38 | | | | |
| 2008/0065532 A1 | 3/2008 | De La Motte | | | | |
| 2008/0091519 A1* | 4/2008 | Foss .................... 705/10 | | | | |
| 2008/0103970 A1* | 5/2008 | Books et al. .................... 705/39 | | | | |
| 2008/0120129 A1 | 5/2008 | Seubert et al. | | | | |
| 2008/0140561 A1 | 6/2008 | Neel | | | | |

OTHER PUBLICATIONS

Daniel Wolfe. (Jul. 28, 2005). An E-variation on Payday Loan Theme. American Banker, p. 1.*

Downes, "How to avoid exchange charges, Wasting Money, A foreign currency bank account could be the answer", The Daily Telegraph, London (UK), Mar. 10, 2007, p. 12.

Co-pending U.S. Appl. No. 13/450,617, filed Apr. 19, 2012, titled "Machine, Methods, and program Product for Electronic Inventiory Tracking".

Co-pending U.S. Appl. No. 13/474,519, filed May 17, 2012, titled "Compuerterized Extension of Credit to Existing Demand Deposit Accounts, Prepaid Cards and Lines of Credit Based on Expected Tax Refund Proceeds, Associated Systems and Computer Program Products".

Office action from co-pending U.S. Appl. No. 12/338,497, dated Aug. 18, 2011.

Notice of Allowance for co-pending U.S. Appl. No. 12/417,199 dated Aug. 18, 2011.

Notice of Allowance for co-pending U.S. Appl. No. 12/417,211 dated Aug. 22, 2011.

Notice of Allowance for co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Office Action in co-pending U.S. Appl. No. 12/367,187 dated Jun. 27, 2011.
Office Action in co-pending U.S. Appl. No. 12/609,896 dated Apr. 5, 2011.
Office Action in co-pending U.S. Appl. No. 12/417,162 dated Apr. 13, 2011.
Office Action in co-pending U.S. Appl. No. 12/338,684 dated Mar. 4, 2011.
Office Action in co-pending U.S. Appl. No. 12/417,199 dated Mar. 17, 2011.
Office Action in co-pending U.S. Appl. No. 12/465,803 dated Mar. 17, 2011.
Office Action in co-pending U.S. Appl. No. 12/338,584 dated Mar. 22, 2011.
Office Action in co-pending U.S. Appl. No. 12/417,211 dated Mar. 29, 2011.
Office Action in co-pending U.S. Appl. No. 12/407,320 dated Mar. 29, 2011.
Office Action in co-pending U.S. Appl. No. 12/338,402 dated.Feb. 18, 2011.
Office Action in co-pending U.S. Appl. No. 12/338,402 dated Sep. 28, 2010.
Office Action in co-pending U.S. Appl. No. 12/417,162 dated Sep. 3, 2010.
International Search Report for PCT/US09/56072 dated Oct. 20, 2009.
International Search Report for PCT/US09/39504 dated May 27, 2009.
International Search Report for PCT/US09/39512 dated Jun. 8, 2009.
International Search Report for PCT/US09/43978 dated Jun. 30, 2009.
Interntional Search Report for PCT/US09/43988 dated Jul. 14, 2009.
Internaional Search Report for PCT/US09/39492 dated May 14, 2009.
International Search Report for PCT/US09/39495 dated May 18, 2009.
International Search Report for PCT/US08/87689 dated Jun. 17, 2009.
Office Action in co-pending U.S. Appl. No. 12/338,365 dated Jul. 9, 2010.
Final Office Action in co-pending U.S. Appl. No. 12/338,645 dated Jan. 26, 2011.
Office Action in co-pending U.S. Appl. No. 12/338,365 dated Jan. 26, 2011.
Office Action in co-pending U.S. Appl. No. 12/417,162 dated Jan. 19, 2011.
Office Action in co-pending U.S. Appl. No. 12/389,749 dated Feb. 1, 2011.
Office Action in co-pending U.S. Appl. No. 12/338,540 dated Sep. 1, 2011.
Interntaional Search Report for PCT/US09/34692 dated Apr. 14, 2009.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Final Office Action in co-pending U.S. Appl. No. 12/338,584 dated Sep. 15, 2011.
Final Office Action in co-pending U.S. Appl. No. 12/338,684 dated Sep. 23, 2011.
Office Action in co-pending U.S. Appl. No. 12/397,113 dated Sep. 30, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Office Action in co-pending U.S. Appl. No. 12/465,306 dated Nov. 10, 2011.
Office Action in co-pending U.S. Appl. No. 12/626,349 dated Nov. 22, 2011.
Final Office Action in co-pending U.S. Appl. No. 12/338,440 dated Jan. 19, 2012.
Office Acntion in co-pending U.S. Appl. No. 12/607,780 dated Mar. 19, 2012.
Notice of Allowance in co-pending U.S. Appl. No. 12/562,331 dated Mar. 20, 2012.
Notice of Allowance in co-pending U.S. Appl. No. 12/465,803 dated Mar. 20, 2012.
Final Office Action in co-pending U.S. Appl. No. 12/389,749 dated Mar. 29, 2012.
Final Office Action in co-pending U.S. Appl. No. 12/731,852 dated Apr. 5, 2012.
Final Office Action in co-pending U.S. Appl. No. 12/465,306 dated Apr. 11, 2012.
Notice of Allowance in co-pending U.S. Appl. No. 13/349,423 dated Apr. 13, 2012.
Office Action in co-pending U.S. Appl. No. 12/877,490 dated Apr. 18, 2012.
Office Action in co-pending U.S. Appl. No. 12/892,847, dated Apr. 30, 2012.
Office Action in co-pending U.S. Appl. No. 12/338,540, dated Mar. 15, 2012.
Notice of Allowance from co-pending U.S. Appl. No. 12/609,896, dated Jan. 3, 2012.
Notice of Allowance from co-pending U.S. Appl. No. 13/233,268, dated Dec. 13, 2011.
Office Action from co-pending U.S. Appl. No. 12/367,187, dated Jan. 6, 2012.
Office Action from co-pending U.S. Appl. No. 12/731,852, dated Dec. 22, 2011.
Notice of Allowance from co-pending U.S. Appl. No. 12/465,803, dated Dec. 20, 2011.
Office Action for co-pending U.S. Appl. No. 13/232,405, dated Feb. 2, 2012.
Final Office Action for co-pending U.S. Appl. No. 12/465,277, dated Feb. 28, 2012.
Notice of Allowance for co-pending U.S. Appl. No. 12/417,182, dated Feb. 14, 2012.
Final Office Action for co-pending U.S. Appl. No. 12/338,497, dated Mar. 1, 2012.
Office Action for co-pending U.S. Appl. No. 12/877,524, dated Feb. 14, 2012.
Office Action for co-pending U.S. Appl. No. 12/700,681, dated Mar. 23, 2012.
Final Office Action for co-pending U.S. Appl. No. 13/232,405, dated May 22, 2012.
Jane Boon Pearlstine, "Lenders, Borrowers Hook Up Over the Web: Prosper.com and Other Sites Provide Forum for Individual Bidders Willing to Offer Small Loans", Wall Street Journal, May 20, 2006.
United Nations Conference on Trade and Development. "E-Finance and Small and Medium-Size Enterprises (SMEs) in Developing and Transition Economics", UNCTAD expert Meeting, Oct. 17, 2001.
Tim Jones, "Paradigms Lost", RSA Journal, Oct. 2006, pp. 28-31.
Diego Rumiany, "Internet Bidding for Microcredit: Making it Work in the Developed World, Conceiving it for the Developing World", Mar. 2007.
Stefan Heng, Thomas Meyer and Antje Stobbe, "Implications of Web 2.0 for Financial Institutuions: Be a Driver, Not a Passenger", Munich Personal RePEc Archive, Jul. 31, 2007.
Matt Flannery, "Kiva and the Birth of Person to Person Microfinance", Innovations, pp. 31-58, Winter & Spring 2007.
Michael K. Hulme adn Collette Wright, "Internet Based Social Lending Past, Present and Future", Social Futures Observatory, Oct. 2006.

Richard W. Coleman, "Is the Future of the Microfinance Movement to be Found on the Internet?", International Trade and Finance Association Working Papers, 2007.
Amanda Scott and Patrick Towell, "The Web We Weave", Financial World, pp. 12-15, Nov. 2006.
Prosper, "Access and Transparency through Person-to-Person Lending." FDIC Advisory Committee on Economic Inclusion, Mar. 28, 2007.
Co-pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,712, filed Dec. 18, 2006, titled "Computer-Implemented Methods, Program Product, and System to Enhance Banking Terms Over Time".
Co-pending U.S. Appl. No. 12/338,684, filed Dec. 18, 2006, titled "Transfer Account Systems. Computer Program Products, and Associated Methods".
Co-pending U.S. Appl. No. 12/336,497, filed Dec. 18, 2006, titled "Private Label Promotion Card System, Program Product, and Associated Computer-Implemented Methods".
Co-pending U.S. Appl. No. 12/336,540, filed Dec. 18, 2008, titled "Private Lable Promotion Card System, Program Product and Associated Computer-Implemented Methods".
Co-pending U.S. Appl. No. 12/338,584, filed Dec. 18, 2008, titled "Transfer Account systems, Computer Program Products, and Methods to Prioritize Payments From Preselected Bank Accounts".
Co-pending U.S. Appl. No. 12/336,645, filed Dec. 18, 2008, titled "Transfer Account Systems, Computer Program Products and Methods to Prioritize Payments From Preselected Bank Accounts".
Co-pending U.S. Appl. No. 12/554,659, filed Sep. 4, 2009, titled "System, Method and Program Product for Foreign Currency Travel Account".
Co-pending U.S. Appl. No. 12/554,432, filed Sep. 4, 2009, titled "System, Program Product and Methods for Retail Activation and Reload Associated With Partial Authorization Transactions".
Cross, Sam Y., All About . . . the Foreign Exchange Market in the United States, 1998. Federal Reserve Bank of new York.
Wolfe, Daniel, "An E-Variation on Payday Loan Theme", American Banker, Jul. 28, 2005.
Fincial Advice Investment Money Oct. 1, 2009 at 5:50pm, HSBC Offshore Internet Banking (Cited in Notice of Allowance in co-pending U.S. Appl. No. 12/554,659 by Examiner).
Financial Advice Investment Money Oct. 1, 2009 at 7:25 am, HSBC Offshore Internet Banking (Cited in Notice of Allowance in co-pending U.S. Appl. No. 12/554,659 by Examiner).
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Offline of the State Controller, Mar. 7, 2007.
Parrott, James, "Jittery Wall Street, Calm City?", Gotham Gazette, Apr. 16, 2007.
Zandi Mark, "Washington Throws the Economya Rope", Moody's Economy.com, Jan. 22, 2008.
Blair, Christine E., et al., "Challenges to the Dual Banking System: The Funding of Bank Supervision". FDIC Bank Review, Mar. 31, 2006.
"Developing Asia and the World", Asian Development Bank 2002.
Microtrax LTD., PC Electronic Payment Systems Reference Manual, 1995 (361 pages).
Caskey, John P. et al., "Is the Debit Card Revolution Finally Here", Federal Reserver Bank of Kansas City, Economic Review Fourth Quarter 1994, pp. 70-95, vol. 79, #4 (17 pages).
Castaneda, Laura, "Business Promote Services to Customers Day in and Day Out", The Dallas Morning News, Nov. 26, 1994 (3 pages).
Mannix, Margaret, "Checkout Tech", U.S. News and World Report, Feb. 27, 1995, (6 pages).
"Credit Terminals to be Used at Canadian Liquor Outlets", Card News, Jan. 23, 1995. (1 page).

"Debit Card Popularity on the Rise," Chain Store Age Executive, Jan. 1994, (1 page).
"Debit Goes to Dinner", Credit Card Management, New York, Oct. 1994 (2 pages).
Peppard, Alan, "Down and Dirty in Deep Ellum," The Dallas Morning News, Dec. 3, 1994 (2 pages).
Everest Reference Manual VeriFone Part No. 25399, Revision A Manual Revision 1.0, Jul. 1995, (66 pages).
"Express Cards and Trains", Chain Store Age Excutive Edition, Jan. 1995, (1 page).
Brown, Suzanne "Goodnight Amy, Meg, Beth and Jo", Rocky Mountain News, Dec. 8, 1994 (1 page).
Klein, Robert J., "Here Comes the Debit Card", D& B Reports, Jul./Aug. 1990 (2 pages).
Hypercom S7C Advertisement, Chain Store Age, Sep. 1995 (4 pages).
Hypersom S7SC Advertisement, Chain Store Age, Feb. 1996 (2 pages).
IBM 4680-4690 Advanced Payment System for Chain Drug Sales Application User's Guide, Nov. 1996 (256 pages).
IBM 4680-4690 Advanced Payment System for Chain Drug Sales Application User's Guide, Jul. 1996 (248 pages).
IBM 4680-4690 Advanced Payment Systems for Supermarket Application User's Guide, Sep. 1996 (222 pages).
Fox, Linda A., "Keep an Eye on Your Credit Card," The Toronto Sun, Aug. 9, 1996 (1 page).
Pyatt, Rudolph A., Jr., "Mobil Stations to Permit Use of Bank Cards", The Washington Post (1 page).
NCR 4430-5000 MSR/PIN User's Guide, 1994 (265 pages).
Nieman Marcus: High-Tech for the Holidays, ADWEEK, Dec. 5, 1994 (1 page).
Neiman Marcus Offers Electronic Gift Certificate, Card Fax, Jan. 23, 1995 (1 page).
Neiman Marcus to Launch NM Express Automated Gift Card, PR Newswire, Nov. 22, 1994 (1 page).
NM Express Card Advertisement, The New Yorker, Dec. 12, 1994 (3 pages).
Service Mark Registration No. 1,981,044 for "NM Express Card", registered Jun. 18, 1996 (1 page).
Omni 480/490 Programmer's Guide, VeriFone Part No. 12924—Revision A, Manual Revision 1.0, Oct. 1993 (228 pages).
"One Company's Diversification Shakes Up Peripherals Market", Chain Store Age, Jun. 1996 (3 pages).
O'Keefe, Michael, "Portable POS Terminal Mean Greater Convenience", Bank Systems & Technology, Nov. 1994 (2 pages).
"POS Terminal Can Handle Direct Debits", ABA Banking Journal, Sep. 1984 (2 pages).
Racel Corp. Advertisement, POS Terminal Eliminates Credit Card Vouchers, ABA Banking Journal, Nov. 1985 (2 pages).
Szabo, Joan C., "The Changing World of Financial Services", Nation's Business, Oct. 1994 (7 pages).
VeriFone Everest Advertisement, Stores, May 1995 (2 pages).
VeriFone Folio (TM) Brings Credit and Debit Card Payment to the Restaurant Table, PR Newswire, May 16, 1994 (3 pages).
Barnes, David B., VeriFone Introduces Everest (TM) Customer Activated Payment System to Multi-Lane Retail Market, OR Newswire, Feb. 20, 1995 (2 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, VeriFone Part No. 00483-Revision D, Manual Revision 3.01, Apr. 1990 (144 pages).
Microtrax, LTD. Omni 490 M (and 490ML) Operation Manual for Integrated and Non-Integrated Configurations, 1994 (60 pages).
Microtrax Electronic Payment Systems: The MicroTrax Pinstripe Lane Equipment Users Guide, MicroTrax Ltd., Newport Beach, CA 1991 (54 pages).
IBM 4680-4690 Supermarket Application—Electronic Funds Transfer Feature Enhancement: User's Guide, IBM Corp., Research Triangle Park, NC, Sep. 1995 (318 pages).

IBM 4680 General Sales Application Electronic Funds Transfer User's Guide, IBM Corp., Research Triangle Park, NC, Dec. 1990 (260 pages).

IBM 4680 General Sales Application Electronic Funds Transfer User's Guide, IBM Corp., Research Triangle Park, NC, Mar. 1991 (263 pages).

IBM 4680 General Sales Applications: Guide to Operations, Research Triangle Park,NC, Jun. 1991 (422 pages).

Krino, Gary, et al., "A Birthday Card That Pays Off", The Orange County Register, Jul. 19, 1996 (2 pages).

Cohen, Bruce, "Alternative to Cash Gains Ground", The Financial Post, Apr. 22, 1994 (2 pages).

Bank of Boulder POS Debit Solution at the Table Now in Beta: First Bank to Certify IVI Spirit C2000 on MAPP (R), Business Wire, Aug. 3, 1994 (1 page).

Co-pending U.S. Appl. No. 12/562,331, filed Sep. 18, 2009, titled "Computerized Extension of Credit to Existing Demand Deposit Accounts, Prepaid Cards and Lines of Credit Based on Expected Tax Refund Proceeds, Associated Systems and Computer Program Products".

Co-pending U.S. Appl. No. 12/700,681, filed Feb. 4, 2010, titled System and Computer Program Product to Issue a Retail Prepaid Card including a User-Designed External Face Using a Chit and Related Computer Implemented Methods.

Co-pending U.S. Appl. No. 12/814,405, filed Jun. 11, 2010, titled Environmental-Friendly Fuel Credit Card System, Program Product, and Computer-Implemented Methods.

Co-pending U.S. Appl. No. 12/877,490, filed Sep. 8, 2010, titled "System, Program Product, and Method for Debit Card and Checking Account Autodraw".

Co-pending U.S. Appl. No. 12/877,524, filed Sep. 8, 2010, titled System, Program Product, and Method for Debit Card and Checking Account Autodraw.

Co-pending U.S. Appl. No. 12/889,281, filed Sep. 23, 2010, titled "Computer-Implemented Methods, Computer Program Products, and Systems for Enhanced Loan Product Repayments".

Co-pending U.S. Appl. No. 12/892,847, filed Sep. 28, 2010, titled "Computer-Implemented Methods, Computer Program Products, and Systems for Management and Control of a Loyalty Rewards Network".

Co-pending U.S. Appl. No. 12/731,852, filed Mar. 25, 2010, titled "Machine, Program Product, and Computer Implemented Methods for Confirming a Mobile Banking Request".

Co-pending U.S. Appl. No. 13/036,076, filed Feb. 28, 2011, titled "Machine, Program Product, and Computer-Implemented Method to Construct a Person-To-Person Loan".

Co-pending U.S. Appl. No. 12/417,199, filed Apr. 2, 2009, titled "System, Program Product, and Associated Methods to Autodraw for Micro-Credit Attached to a Prepais Card".

Co-pending U.S. Appl. No. 12/389,749, filed Feb. 20, 2009, titled "Methods to Advance Loan Proceeds on Prepaid Cards, Associated Systems and Computer Program Products".

Co-pending U.S. Appl. No. 12/397,113, filed Mar. 3, 2009, titled "Person-To-Person Lending Program Product, System, and Associated Computer-Implemted Methods".

Co-pending U.S. Appl. No. 12/338,365, filed Dec. 18, 2008, titled "Transfer Account Systems, Computer Program Products, and Associated Computer-Implemented Methods".

"Letter of Credit Explained: What is Letter of Credit?", Dec. 26, 2005, pp. 1-2.

VIPGift Received Investment from Summit Partners and Bridgescale Partners, Nov. 11, 2008, Chattanooga, TN and Palo Alto, CA.

Bank Deals-Best Rates and Deals: EverBank's World Currency CDs-My Interview with EverBank's Executive Frank Trotter, http://bankdeals.blogspot.com, Jul. 29, 2007.

Foreign Exchange Market, http://en.wikipedia.org.

Avoid Gift Card Pitfalls, ConsumerReports.org.

Zubko, N., "An Automotic Connection Electronic Transaction Tools Help Manufactures Connect With Suppliers to Streamline Sourcing Efforts", Industry Week, Jul. 2008, pp. 26-27, vol. 257, No. 7.

Lazarus, David, "120% rate for Wells' Advances", Oct. 16, 2004, San Francisco Chronicle (cited in Final Office Action in co-pending U.S. Appl. No. 12/338,684 dated Sep. 23, 2011).

Congressional Budget Office, "Emerging Electronic Methods for Making Payments" (Jun. 1996), CBO.

Coady et al., "Targeted anti-poverty intervention: A selected annotated bibliography" (Apr. 2002), World Bank.

Business Dateline, Q Comm Expands Calling Card Products with Best Telecom Point-of-Sale Activated Cards; All Q Comm Verifone Merchants Can Now Deliver Durable Calling Cards (Dec. 6, 2010), Business Wire (Dec. 8, 2011).

MasterCard Electronic Prepaid (Oct. 2003), The Nilson Report (798), (Dec. 20, 2011), The Banking Source (Document ID 474833171).

* cited by examiner

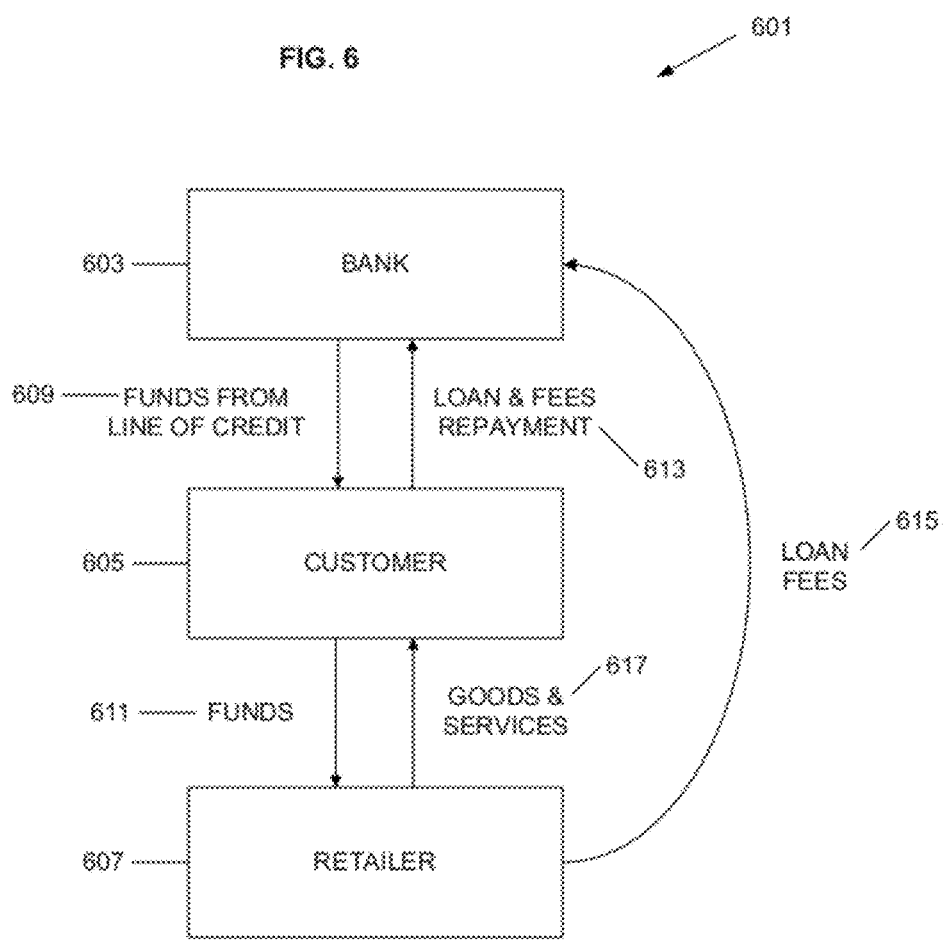

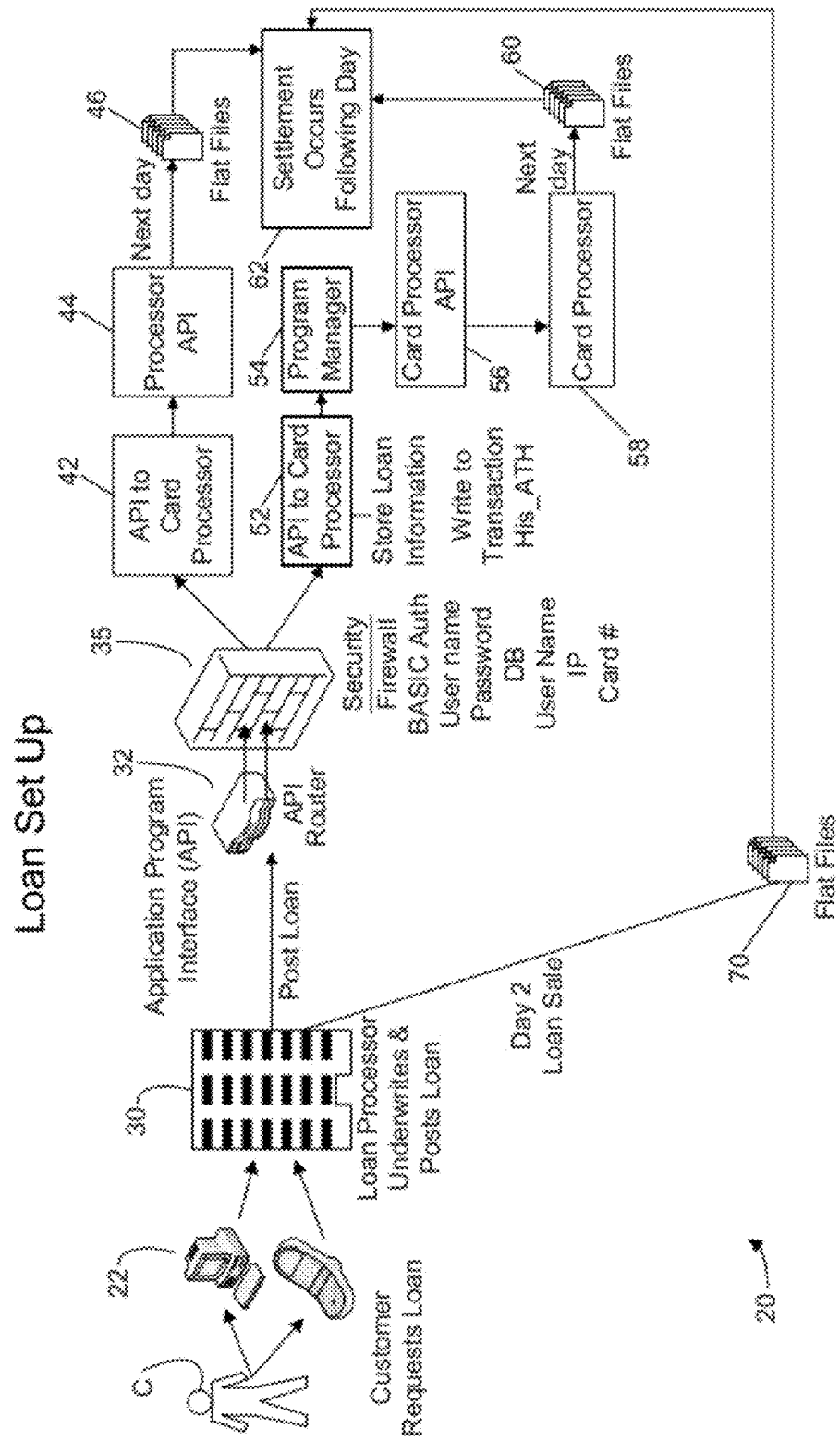

| Browser Tool Bar |
|---|

Create New Account

Complete the fields below to set up Customer Line of Credit ("LOC") account. Click on the CONTINUE button for next screen. The CANCEL button returns you to the Log-In page without saving any changes.

Required fields are marked *

LOC Account Details

Create User ID [        ]

Create Password [        ]

Confirm Password [        ]

Verification Information

Prepaid Card Number [        ]

Last 4 Digits of Your SSN [    ]

Year of Birth [    ]

E-mail Account Details (*optional*)

E-mail Address [        ]

Confirm E-Mail Address [        ]

Computer Screen Interface Menu

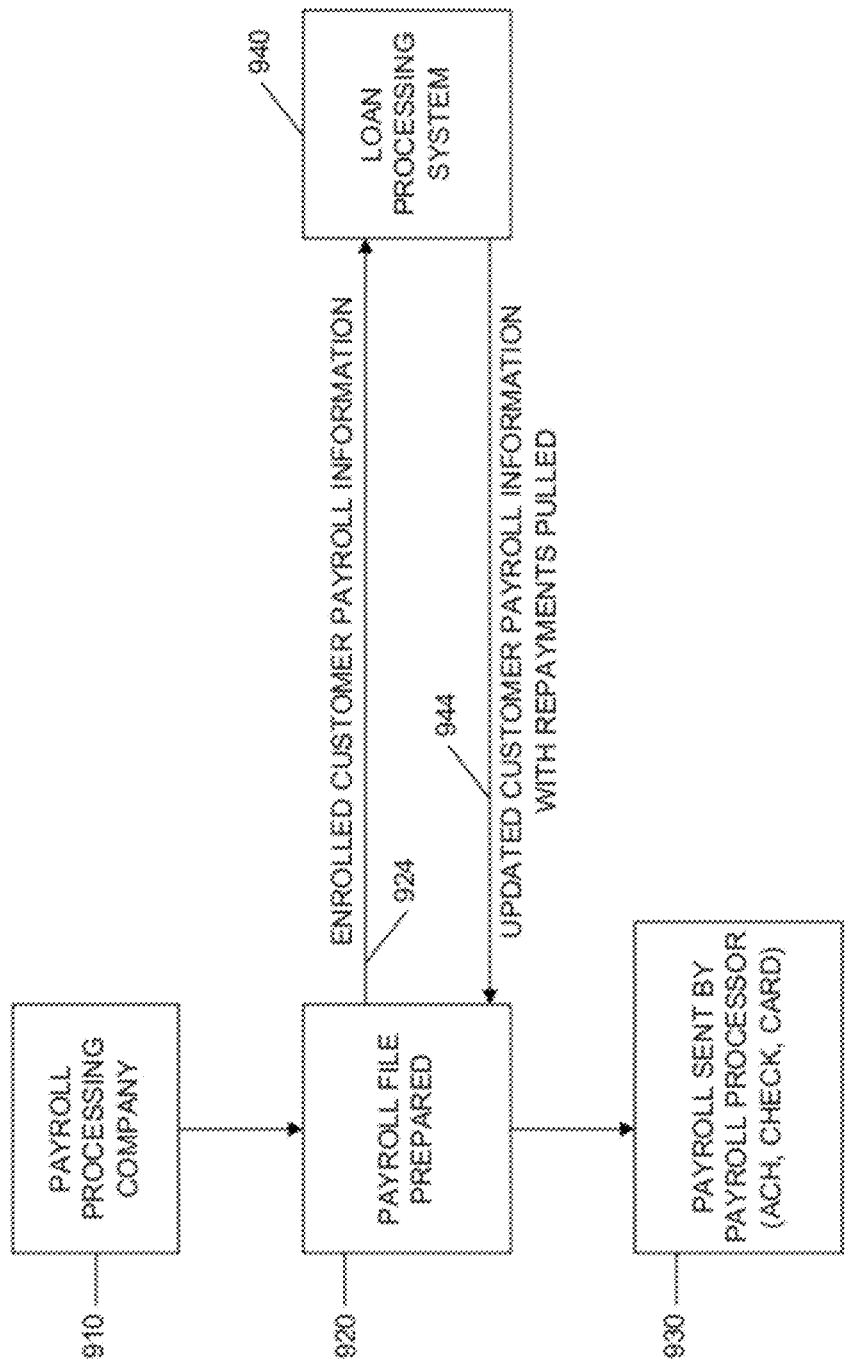

FIG. 12

WWW.XXXXX.COM

ACCOUNT ACTIVITY STATEMENT
ACCOUNT XXXX XXXX XXXX XXXX

| DATE | DESCRIPTION | CREDIT | DEBIT | CARD BAL | LOC AVAIL | LOC BAL |
|---|---|---|---|---|---|---|
| 1/1/2009 | CARD BALANCE | | | $ 21 | $ 60 | $ 0 |
| 1/2/2009 | LOC ADVANCE & FEE (Fee = 2 X $2.50 PER $20 INCREMENT) | $ 40 | | $ 61 | $ 15 | $ 45 |
| 1/2/2009 | GOODS PURCHASE | | $ 42 | $ 19 | $ 15 | $ 45 |
| 1/9/2009 | RETAILER REBATE (2x$1) | | | $ 19 | $ 17 | $ 43 |
| 1/15/2009 | PAYCHECKCO. | $ 750 | | $ 769 | $ 17 | $ 43 |
| 1/15/2009 | LOC REPAYMENT | | $ 43 | $ 726 | $ 60 | $ 0 |
| 1/16/2009 | LOC INCREASE | | | $ 726 | $ 90 | $ 0 |

SYSTEM, PROGRAM PRODUCT, AND METHOD TO AUTHORIZED DRAW FOR RETAILER OPTIMIZATION

RELATED APPLICATIONS

This application is a continuation of and claims priority and the benefit to U.S. patent application Ser. No. 13/349,423, by Ahlers et. al, titled "System, Non-transitory Memory with Computer Program and Associated Methods for Micro-Credit to Prepaid Card, filed on Jan. 12, 2012, which is a continuation of and claims priority and the benefit to U.S. patent application Ser. No. 13/233,268, by Ahlers et al., titled "System, Program Product, and Associated Methods to Autodraw for Micro-Credit Attached to a Prepaid Card" filed on Sep. 15, 2011, which claims priority to and the benefit of U.S. patent application Ser. No. 12/417,199, by Ahlers et al., titled "System, Program Product, and Associated Methods to Autodraw for Micro-Credit Attached to a Prepaid Card" filed on Apr. 2, 2009, which claims priority to and the benefit to U.S. Provisional Patent Application Ser. No. 61/042,612, by Ahlers et al., titled "System, Program Product, and Associated Methods to Autodraw for Micro-Credit Attached to a Prepaid Card" filed on Apr. 4, 2008, and U.S. Provisional Patent Application Ser. No. 61/042,624, by Crowe et al., titled "System, Program Product, and Method to Authorize Draw for Retailer Optimization" filed on Apr. 4, 2008, all of which are incorporated herein by reference in their entireties.

BACKGROUND

1. Field of Invention

The present invention relates generally to the financial service and banking industries, and, more particularly, to systems, program products, and associated methods for providing a line of credit optimized for a retailer to a demand deposit account or a prepaid card.

2. Background

It is known that tens of millions of consumers in the United States have either limited or no access to traditional credit, either as a result of poor or limited credit history. It is known that tens of millions of consumers have demand deposit accounts (DDA) with overdraft protection, which allows them to borrow funds. It is further known that millions of prepaid cards are issued each year in the United States. It is also known that many of the customers of prepaid cards rely primarily on cash and a prepaid card account for their personal finances; these customers, for example, often do not have a traditional checking, savings, or other bank deposit account, and they usually do not write checks. It has been acknowledged by many that those without bank accounts and who often rely on prepaid cards, as well as those routinely using overdraft protection for short-term loans, may be underserved. These customers are typically not easily able to access credit through traditional banking channels, though they may have an ongoing relationship with a prepaid card issuer, for example.

Even when credit is available to these customers, the costs associated with traditional lending products, including interest, fees, and penalties, are often expensive and can ultimately contribute to the financial situation that negatively impacts the consumer's access to credit. For example, a typical overdraft fee charged by a bank for "bounced" check is often larger than the overdraft amount itself.

SUMMARY OF INVENTION

In view of the foregoing, Applicants have recognized the costs associated with traditional lending products and the structure of these costs, including interest, fees, and penalties, as sources of problems to consumers and also third parties who sell to these customers, e.g. retailers, or who might otherwise sell to these customers. For example, Applicants have recognized that customer funds spent on the costs associated with traditional lending products, including interest, fees, and penalties, are unavailable to be spent on other goods and services. Moreover, costs can be very expensive for a small amount of credit because of the structure. For example, a $35 overdraft fee is very expensive for a $4 overdraft. In addition, Applicants have recognized a need for enhanced lending options, bank products, and prepaid card products optimized for a retailer so that a retailer can compete for these customer funds. The present invention provides embodiments of systems, program products, and methods for providing a line of credit, optimized for a retailer and attached to a demand deposit account or a prepaid card.

According to embodiments of the present invention, a bank or other financial or lending institution can offer a customer a line of credit optimized for a retailer. Funds from the line of credit are accessed in preselected loan increments, e.g., $20 increments, with a customer fee and a retailer fee associated with each increment. In one embodiment of the present invention, the customer fee is zero ($0), and the retailer pays all fees associated with access to the line of credit, say, e.g., $2.50 per preselected loan increment, so that the customer has free access to draws against the line of credit for customer transactions at the retailer. That is, the customer must repay the principle, but no interest or fees for a loan for a customer transaction at the retailer.

In another embodiment of the present invention, the customer pays only a portion of the fees associated with a draw from the line of credit for a customer transaction at the retailer, for example, $1.00 instead of a typical $2.50. That is, the customer receives a discount on the fee for a draw on a line of credit for customer transactions at a retailer. The retailer can pay the difference so that the sum of the retailer the and discounted customer fee equal the typical fee. For example, the retailer fee of $1.50 plus a discounted customer fee of $1.00 equal the $2.50 typical fee. Alternately, the sum of the retailer fee and discounted customer fee can be greater or less than the typical fee. For example, while the typical fee can be $2.50 per preselected loan increment of $20, the customer fee can be $1.00 and the retailer fee can be $1.00, for a sum of $2.00, which is less than the typical fee of $2.50. In another example, the discounted customer fee can be $2.00 and the retailer fee can be $1.00, for a sum of $3.00, which is greater than the typical fee of $2.50.

In yet another embodiment of the present invention, the total available line of credit for the customer is decremented by the value of the customer fee as part of the customer transaction, but later is incremented by the value of the retailer fee to thereby define a rebate to the customer of the retailer fee.

The benefits of the embodiments of the present invention to the customer include, for example, providing a short-term borrowing alternative that is more cost effective than other expensive financial service products, such as overdraft protection and payday loans, and more convenient to consumers. Embodiments of a line of credit, however, can still be monitored, controlled and managed by a bank or other regulated financial or lending institution, which can be a significant benefit from the perspective of the customer, regulators, and public opinion through consumer activists. To the customer, the benefits of the embodiments of the present invention also include free or discounted access to credit. To the retailer, the benefits of the embodiments of the present invention include reducing the effective price of customer purchases at the retailer and also the promotional value of these discounts. As understood by those skilled in the arts, the advertising value of free credit is substantial.

Furthermore, the retailer benefits from additional sales and profits enabled by the embodiments of the present invention. For example, according to one embodiment of the present invention, a retailer sells an item to a customer for $10. The item costs the retailer $6 and has a $4 mark-up. If the customer transaction for this item requires the customer's borrowing of a preselected loan increment of $20 with a customer fee of $0 and retailer fee of $2.50, then the retailer earns an additional $10 in sales and $1.50 in profits through this transaction. The $1.50 profit is the $4 mark-up for the item minus the $2.50 fee paid by the retailer. The effect of the embodiments of the present invention is to lower the profit margin, in this example from 40% to 15% (or $4 per $10 of sales to $1.50 per $10 of sales), for customer transactions involving embodiments of the present invention, while preserving the profit margin for other customer transactions as understood by those skilled in the art. Therefore, the embodiments of the present invention target a discount to customer transactions where credit or financing is needed or useful, and advantageously do not provide a general discount or price reduction.

According to other embodiments of the present invention, a predetermined portion of the total available line of credit can be, for example, reserved for customer transactions associated with the retailer. That is, the customer has an increase in available credit from the line of credit for transactions associated with the retailer. For example, according to an embodiment of the present invention, the total available line of credit is $300, with $200 reserved for customer transactions at the retailer and $100 generally available. According to embodiments of the present invention, the portion of credit reserved for customer transactions at the retailer can include different fee amounts received by the financial institution, e.g., the bank, as discussed above, and a different risk assessment from the portion of credit generally available. As understood by those skilled in the art, the different risk assessment for the portion of credit reserved for customer transactions at the retailer from the portion of credit generally available can be due to the source of payment of the fees, the nature of customer transactions at the retailer, or other causes. For the credit reserved for transactions at the retailer, the retailer, not the customer, is the source of payment for all or a portion of the fees. In addition, if the retailer is a casino, the risk assessment can be different than a general customer transaction; likewise, if the retailer is a store that features work shoes and uniforms for hospital employees, the risk assessment can be different than a general customer transaction as understood by those skilled in the art.

Embodiments of the present invention can, for example, provide access to a line of credit and advance funds within an authorization stream for a proposed transaction. For example, a customer goes to a retailer and proposes to purchase $22 in goods using a prepaid card; the balance on the prepaid card is only $7. The customer, however, has an established line of credit for the prepaid card with a financial institution, e.g., a bank, for $150, with a total credit available of $130. Within the authorization stream for the proposed transaction, embodiments of the present invention can determine to advance funds through the line of credit to the customer account for the customer transaction, allowing the customer to purchase the items from the retailer without having to leave the store. Moreover, because draws, for example, are available in preselected increments, customers are not forced to borrow amounts that exceed their borrowing needs.

Alternately, embodiments of the present invention can provide funds in advance of purchase to the customer account responsive to a request, which can conveniently include a written correspondence from the customer, a customer selection on a website, a telephone conversation with an interactive voice response unit (IVRU), a telephone conversation with a customer service representative, an interaction using mobile phone, or a combination of these as understood by those skilled in the art, allowing a customer to obtain financing without the need to walk into a brick and mortar location. In this model of an embodiment of the present invention, for example, a customer transaction at the retailer can later be reported to the financial institution, e.g., a bank, so that a fee rebate for an eligible transaction can be applied to the appropriate line of credit balance accordingly.

Embodiments of the present invention provide, for example, for establishing a line of credit with a financial institution, e.g., a bank, which can include the customer opting in to a program with the financial institution through an interface access device providing access to a line of credit product, e.g., a computer display device, a kiosk, such as located at a retail store, a point of sale terminal, an IVRU, a call center, a cell phone, a personal digital assistant ("PDA"), on-line sensors, or other access interfaces as understood by those skilled in the art. A line of credit amount, for example, can be established based on direct deposit data and preselected underwriting formula, as understood by those skilled in the art, that use the amount of direct deposits, among other factors and data, to determine the size of the credit line available.

For example, according to an embodiment of a computer-implemented method of advancing funds using a prepaid card to a customer of a retailer, the computer-implemented method includes establishing a retailer-optimized line of credit with a financial institution, e.g., a bank, for a prepaid card of a customer of retailer responsive to customer underwriting data and predetermined qualification parameters to thereby convert customer underwriting data into line of credit data. The computer-implemented method also includes determining whether to advance funds through the line of credit for a customer transaction and loading the prepaid card with one or more preselected loan increments of funds to thereby convert line of credit data into a value associated with the prepaid card to thereby fund the customer transaction. The preselected increments, e.g., $20, for example, can be less than a total available line of credit, e.g., $300, for a customer having an established line of credit with the financial institution, e.g., the bank. The computer-implemented method further includes decrementing the total available line of credit, e.g., $300, by the one or more preselected increments, e.g., $20, provided for the customer transaction and a predetermined fee amount, e.g., $2.50 or $0, for each of the one or more preselected increments loaded on the prepaid card. The computer-implemented method also includes determining a value of a retailer fee, to be paid by the retailer, having a predetermined amount, e.g., $2, for each of the one or more preselected loan increments loaded on the prepaid card.

In an embodiment of a program product stored in one or more tangible computer readable media and readable by a computer, for example, the program product can operate to perform the following instructions when read by the computer: establishing a retailer-optimized line of credit attached to a customer account, e.g., a prepaid card account, of a customer of a retailer responsive to customer underwriting data and predetermined qualification parameters; determining whether to advance funds through the line of credit for a customer transaction; advancing funds in one or more preselected loan increments for the customer transaction, e.g., loading the prepaid card, the preselected loan increments being less than a total available line of credit with the bank; decrementing the total available line of credit by the cumulative amount of the one or more preselected loan increments provided for the customer transaction and by a predetermined customer fee amount for each of the one or more preselected loan increments; and determining a value of a retailer fee, to be paid by the retailer, having a predetermined amount for each of the one or more preselected loan increments advanced.

An embodiment of a system to advance funds to a customer of a retailer, for example, includes a plurality of customer access interface devices and a remote computer server positioned to provide communication with each of the plurality of customer access interface devices, being associated with a financial institution, and having memory. The system also includes program product stored in the memory of the computer server so that the program product operates to perform the instructions of: establishing a line of credit attached to a customer account with the financial institution for a customer of a retailer through at least one of the plurality of access interface devices with the remote computer server, the line of credit optimized for a retailer, at least one access interface device being defined to provide access to a line of credit product of the financial institution to interface with a potential customer to establish the line of credit; determining whether to advance funds through the line of credit for a customer transaction; initiating provision of only one or more preselected increments of funds for the customer transaction, e.g., advancing funds in one or more preselected loan increments to the customer account to thereby convert line of credit data into a value associated with the customer account to thereby fund the customer transaction, a cumulative amount of the one or more preselected loan increments being less than a total available line of credit for a customer having an established line of credit with the financial institution; decrementing the total available line of credit by the cumulative amount of the one or more preselected loan increments provided for the customer transaction and by a predetermined customer fee amount for each of the one or more preselected loan increments; and determining a value of a retailer fee to be paid by the retailer, the retailer fee having a predetermined amount for each of the one or more preselected loan increments. The system can also include a plurality of point of sale terminals associated with a plurality of retailers, each point of sale terminal having a processor and memory, and a second computer associated with a customer prepaid card account defining a prepaid card processor. The prepaid card processor is in communication with the financial institution computer server and the plurality of point of sale terminals through an electronic communications network. The prepaid card processor has memory and is positioned to process an authorization request for a proposed purchase of one or more items from a point of sale terminal.

Embodiments of the present invention also allow the combining of product enhancements with other complimentary enhancements and can continue to provide significantly improved services and credit products by banking or other financial institutions with the conveniences of traditional banking products in order to increase sales, profits, and financing options at a participating retailer.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 6 is a schematic diagram of a system to advance funds to a customer of a retailer according to an embodiment of the present invention;

FIG. 7 is a schematic diagram of loan set up flow according to embodiments of the present invention;

FIG. 8 is a schematic front elevational view of an embodiment of an access interface of a program product and system in the form of a graphical user interface of a display of a computer according to an embodiment of the present invention;

FIG. 9 is a schematic diagram of a payroll processor system according to an embodiment of the present invention;

FIG. 12 is a front plan view of a display screen of a computer displaying an excerpt of an account activity statement according to an embodiment of the present invention.

DETAILED DESCRIPTION OF INVENTION

Figure 1:
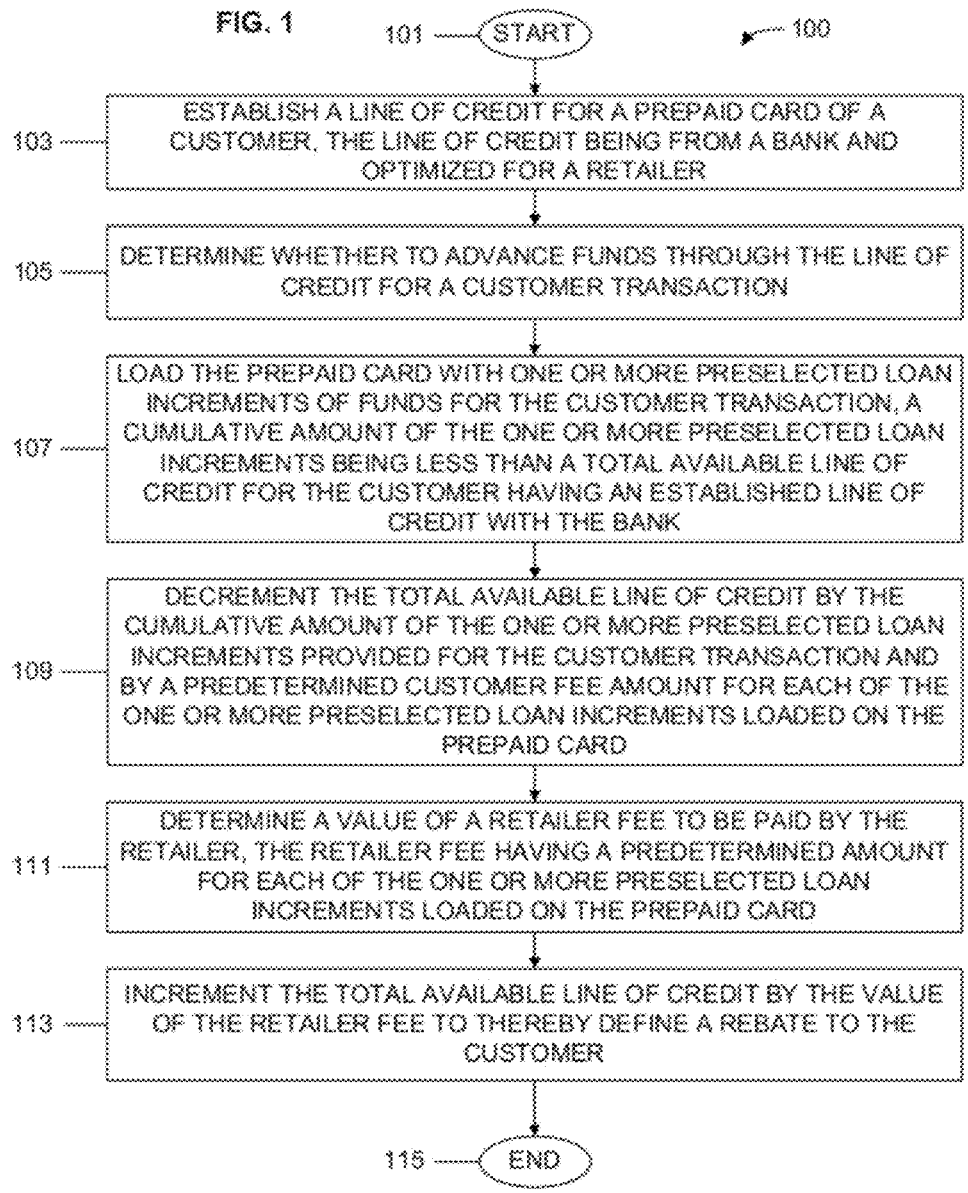
FIG. 1 is a flow diagram of a method of advancing funds using a prepaid card to a customer of a retailer according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

As illustrated in FIGS. 1-12, embodiments of systems 300, 601, program products 401, 501, 1000, and methods 100, 200, e.g., computerized methods, of the present invention can be provided through an electronic communication network 309 such as a global communication network like the Internet, World Wide Web, or Web 2.0, through a banking type of network, or through a retail, customer or intranet type of network as understood by those skilled in the art. Program products 401, 501, 1000, for example, can be stored on a computer server 307, 403, 503 at bank or financial institution 603, can have memory, and be accessible by a plurality of computers 301, and each can have their own respective memory 304C, as well as operating system and browsing software 304E or program product as desired and as understood by those skilled in the art, at bank customer locations, e.g., customer homes, office, and retail locations.

Embodiments of the provide invention provide various ways to establish a line of credit, including the customer opting in to a program with a bank through a written correspondence from the customer, a customer selection on a website, a telephone conversation with an interactive voice response unit (IVRU), a telephone conversation with a customer service representative, a mobile phone, or a combination as understood by those skilled in the art. When launched as an accessible website, for example, the website can provide various software based program product segments, as will be understood by those skilled in the art, from which bank products are accessible or downloadable (see, e.g. FIG. 3). The website preferably includes secure site pages or portions, as understood by those skilled in the art, as financial and personal data on or for customers may be provided by a customer. As described herein, the website in an exemplary embodiment includes bank account, bank card, or prepaid card management capabilities as understood by those skilled in the art to enhance qualification of customers and tracking of customer usage data or history. By including this feature, embodiments of other program products, methods, and systems can be enhanced and provided.

In an embodiment of the present invention involving establishing a line of credit from a bank or other financial institution for a customer of a retailer, the bank can require or define, for example, the following initial qualification parameters for a customer: (1) customer should be a prepaid card customer; (2) customer should provide employment and wage verification through a direct deposit history; (3) customer should authorize bank initiated withdrawals from their prepaid card; and (4) customer should have a history of at least one electronic deposit. Embodiments can include converting such underwriting data into line of credit data. In addition, the following on-going criteria, for example, should be met in an example embodiment: (1) customer's card account should be in good standing, not overdrawn, cancelled, or in default of the customer agreement; and (2) customer should continue to initiate electronic deposits to the card. The bank or financial institution, for example, may elect to make the account ineligible for a line of credit if an electronic deposit ceases. The bank or financial institution can have a dedicated program manager qualify, approve, or authorize a customer or can use program product stored in memory to make sure the criteria or parameters are satisfied or meet certain thresholds as selected by the bank or financial institution.

For example, as illustrated in FIG. 7, a customer C can go on-line through a computer or IVRU 22 in a system 20 to register at a website using a program product according to embodiments of the present invention and launched from a server, e.g., at a loan processor, underwriting organization, bank, lending institution, other financial institution, payroll processing company, or other entity which can provide the line of credit product, among others, as will be understood by those skilled in the art. The form or qualification parameters can be consistent with one or more underwriting organizations or institutions or set/defined by the bank or financial or lending institution.

As understood by those skilled in the art, a loan, micro-loan, repayment, line of credit, or other type of payment processor, such as provided by First Data Corporation, Total Systems Services, Inc., Fidelity National Information, Inc., or as custom developed by a bank, a financial institution, or other organization, operates to provide a customer interface on a line of credit or micro-loan request (see, e.g., access interface 800 of FIG. 8 in the form of a computer display having a graphical user interface) and determines and decides whether a potential or existing customer qualifies for a line of credit product. First Data Corporation, formerly First Data Resources, is a transaction processing company, including prepaid cards, and is headquartered in Greenwood Village, Colo., as understood by those skilled in the art. With headquarters located in Columbus, Ga., Total System Services, Inc. provides electronic payment services to financial institutions and companies, including consumer-finance, credit, debit, healthcare, loyalty, prepaid, chip and mobile payments, as understood by those skilled in the art. Headquartered in Jacksonville, Fla., Fidelity National Information, Inc. provides core processing for financial institutions, including card issuer, transaction processing, and outsourcing services to financial institutions and retailers, as understood by those skilled in the art. The line of credit or loan processor 319, for example, can be outsourced by a bank if desired, and numerous different loan processors or entities that handle this function can be used as well (see, e.g., FIG. 3 with computer server 319 handling the payment processor and interface access roles for customer lines of credit 321, for example). If the customer qualifies, the credentials can be passed to a bank computer or other financial institution computer 307, and then a flag, code, notation, or other identifier can be associated with a customer's profile in a database 308 so that when the customer desires to access the line of credit, e.g., through a customer purchase transaction using the prepaid card, the process acknowledges the identifier to then allow incremental micro-loans on the line of credit to be granted as described herein. Notably, often a loan or other type of payment processor is card processor specific, and in this instance, a dedicated card processor (see, e.g., prepaid card processor 315 in FIG. 3, and this processor likewise can be associated with computers and have a customer prepaid card account 317 associated with or processed thereby as understood by those skilled in the art) can be used, but also as shown in FIG. 7 and described further in U.S. Provisional patent application Ser. No. 61/029,975 titled "Methods To Advance Loan Proceeds on Prepaid Cards, Associated Systems and Computer Program Products" filed on Feb. 20, 2008 and incorporated herein by reference methods can be used as well to handle card interface to a variety of card processors (including, e.g., Metavante Corporation ("Metavante") of Milwaukee, Wis.), as understood by those skilled in the art.

The customer transaction using a prepaid card, for example, can then cause the request for the loan advance through the line of credit processor 30 or other payment processor. The credit processor 30 then posts notification of the micro-loan request through an application program interface (API) to post the loan advance in real time through an API Router 32 as understood by those skilled in the art. The API Router 32 passes the request through a security firewall 35 which passes the request through the API to a card processor 42 and particular processor API 44, such as, Metavante. The request data can be compared to flat files 46, 60, 70, e.g., data files that have no structural relationship as understood by those skilled in the art, or flat files database so that the bank or financial institution reconciles the loan transaction with the customer's line of credit or other account 62. Some card processors, for example, provide additional processor interfaces or allow development of additional processor interfaces, as understood by those skilled in the art, (see, e.g., API to Program Manager 52). Program manager operations, for example, can be provided by various financial solution/program management companies, such as AccountNow of San Ramon, Calif., as understood by those skilled in the art. A program manager 54, a card processor API 56, and a card processor 58 can be used by the credit processor or other payment processor for a customer transaction as understood by those skilled in the art.

Embodiments of the present invention include, for example, a line of credit product from a bank, a financial institution, or a lending institution; the line of credit provides funds in preselected loan increments, e.g. $20 increments, to a customer. Each preselected loan increment accessed can generate a predetermined customer fee and a predetermined retailer fee. For example, in an embodiment of the present invention, the customer fee is zero ($0), and the retailer pays all fees associated with access to the line of credit, say, e.g. $2.50 per preselected loan increment. In this example, the customer has free access to draws against the line of credit for customer transactions at the retailer. That is, the customer must repay the principle, but no interest or fees for a loan for a customer transaction at the retailer.

In another embodiment of the present invention, the customer receives a discount on the fee for a draw on a line of credit for customer transactions at the retailer. That is, the predetermined customer fee amount for each of the one or more preselected loan increments for a customer transaction is a first amount if the customer transaction is associated with the retailer and is a second amount if the customer transaction is not associated with the retailer, the second amount being greater than the first amount, to thereby define a fee discount by the retailer. In this embodiment, the customer pays only a portion of the fees associated with a draw from the line of credit for a customer transaction at the retailer, for example, $1.00 instead of typical $2.50. In this embodiment the retailer also pays a fee, and the sum of the customer fee and the retailer fee may be greater than, less than, or equal to the typical fee for access to the line of credit for a transaction not associated with the retailer, as understood by those skilled in the art.

In yet another embodiment of the present invention, the bank or financial institution provides the value of the retailer fee to the customer as a rebate. That is, the total available line of credit is incremented by the value of the retailer fee to thereby define a rebate to the customer. Advantageously, this embodiment allows the access to funds conveniently to occur in advance of a purchase; later a customer transaction at the retailer can be reported to the financial institution, e.g., the bank, so that a fee rebate for an eligible transaction can be applied to the appropriate line of credit balance.

Embodiments of the present invention can provide funds in advance of purchase responsive to a request. The request for an advance can involve a written correspondence from the customer, a customer selection on a website, a telephone conversation with an interactive voice response unit (IVRU), a telephone conversation with a customer service representative, an interaction using mobile phone, or a combination of these as understood by those skilled in the art, allowing a customer to obtain financing without the need to walk into a brick and mortar location. Alternately, embodiments of the present invention can, for example, provide access to a line of credit within an authorization stream for a proposed transaction, allowing the customer to access funds to purchase items from a retailer without having to leave the store and without having to request funds in advance. According to embodiments of the present invention, determining whether to advance funds through the line of credit for a customer transaction can occur within an authorization stream for a proposed transaction and can include receiving proposed transaction data by the financial institution computer from a card reader device associated with a point of sale terminal responsive to the card reader device reading data from a card associated with the customer account and modifying the data to include point of sale data.

The benefits of the embodiments of the present invention to the customer include, for example, a short-term borrowing alternative that is more cost effective than other expensive financial service products, with greater convenience. The benefits further include free or discounted access to credit, in advance of purchase or within an authorization stream. Moreover, because draws, for example, are available in preselected increments, customers are not forced to borrow amounts that exceed their borrowing needs.

To the retailer, the benefits of the embodiments of the present invention include reducing the effective price of customer purchases at the retailer and also the promotional value of these discounts. The promotional value of being able to advertise free credit is substantial as understood by those skilled in the arts. Furthermore, the retailer benefits from additional sates and profits enabled by the embodiments of the present invention. For example, according to one embodiment of the present invention, a retailer sells an item to a customer for $10. The item costs the retailer $6 and has a $4 mark-up. If the customer transaction for this item requires the customer's borrowing of a preselected loan increment of $20 with a customer fee of $0 and retailer fee of $2,50, then the retailer earns an additional $10 in sales and $1.50 in profits through this transaction. The $1.50 profit is the $4 mark-up for the item minus the $2.50 fee paid by the retailer. The effect of the embodiments of the present invention is to lower the profit margin, in this example from 40% to 15% (or $4 per $10 of sales to $1.50 per $10 of sales), for customer transactions involving embodiments of the present invention, while preserving the profit margin for other customer transactions as understood by those skilled in the art. Therefore, the embodiments of the present invention target a discount to customer transactions where credit or financing is needed or useful, and advantageously do not provide a general discount or price reduction.

In an example of another embodiment of the present invention, a customer receives a loan advance of $200 and purchases $190 of goods from the retailer. If the cost of goods to the retailer for the purchase is $125 and the retailer loan fees associated with the advance is $20 (e.g., $2 per $20 loan increment for 10 increments), then the gross profit for the transaction is $45 ($190–$125–$20=$45) even with the loan fees included. To the extent that access to the line of credit is necessary for such transactions, the revenue ($190) and gross profit ($45) represent new sales, additive to the retailer's existing business, as understood by those skilled in the art.

Embodiments of the present invention can include an increase in available credit from the line of credit for transactions associated with the retailer so that a predetermined portion of the total available line of credit is reserved for customer transactions associated with the retailer. For example, the total available line of credit is $300, with $200 reserved for customer transactions at the retailer and $100 generally available.

Products providing embodiments of the present invention can vary by retailer, offer, program, prepaid card holder, cardholder election, promotion, public acceptance and reception, location, season, and other criteria as understood by those skilled in the art.

An embodiment of a system 300 to advance funds to a customer of a retailer, as illustrated in FIGS. 3-12, for example, includes a plurality of customer access interface devices 301 and a remote computer server 307 is associated with a financial institution and positioned to provide communication with each of the plurality of customer access interface devices 301. Each customer computer 301 can include, for example, input-output I/O devices 304A; one or more processors 304B; memory 304C, such as, computer readable media; and a display 304D. The memory 304C of the customer computer 301 can include an Internet browser 304E, a computer application used for accessing sites or information on a network, as understood by those skilled in the art. The financial institution computer 307 can include, for example, input-output I/O devices 306A; one or more processors 306B; memory 306C, such as, computer readable media; and a display 306D. The memory 306C of the financial institution computer 307 can include a computer program product 401 as described herein and can include, for example, one or more databases containing account data files 308. The system also includes program product 401, 501, 1000 stored in the memory of the computer server so that the program product operates to perform the instructions of: establishing a line of credit attached to a customer account at the financial institution for a customer of a retailer through at least one of the plurality of access interface devices with the remote computer server responsive to customer underwriting data and predetermined qualification parameters to thereby convert customer underwriting data into line of credit data, the line of credit optimized for a retailer, at least one access interface device being defined to provide access to a line of credit product of the financial institution to interface with a potential customer to establish the line of credit; determining whether to advance funds through the line of credit for a customer transaction; initiating provision of only one or more preselected increments of funds to the customer account to thereby convert line of credit data into a value associated with the customer account to thereby fund the customer transaction, a cumulative amount of the one or more preselected loan increments being less than a total available line of credit for a customer having an established line of credit with the financial institution; decrementing the total available line of credit by the cumulative amount of the one or more preselected loan increments provided for the customer transaction and by a predetermined customer fee amount for each of the one or more preselected loan increments; and determining a value of a retailer fee to be paid by the retailer, the retailer fee having a predetermined amount for each of the one or more preselected loan increments loaded on the prepaid card. The system 300 can also include, for example, a plurality of point of sale computers 313 associated with a plurality of retailers 311. Each point of sale computer 313 can include, for example, input-output I/O devices 314A; one or more processors 314B; memory 314C, such as, computer readable media. The system 300 further includes a plurality of card readers 312 associated with the plurality of point of sale computers 313. Each card reader 312 has a processor defining an acquiring processor. Prepaid card data can be read by swiping the card through a slot 310C past a reading head of a card reader 312. The card reader 312 can also include a display 310A and input/output (I/O) devices 310B, e.g., a keypad. The system 300 can also include, for example, a line of credit processor or loan processor computer 319 (see also 30 in FIG. 7). A loan processor computer 319 can include, for example, input-output I/O devices 320A; one or more processors 320B; memory 320C, such as, computer readable media. The line of credit or loan processor 319, for example, can be outsourced by a bank if desired, and numerous different loan processors or entities that handle this function can be used as well, as understood by those skilled in the art. The system 300 can also include, for example, a computer associated with a customer prepaid card account 317 defining a prepaid card processor 315. The prepaid card processor 315 has a memory 316C and is positioned to process an authorization request for a proposed purchase of one or more items from a point of sale terminal. The prepaid card processor 315 can include, for example, input-output I/O devices 316A; one or more processors 316B; and memory 316C, such as, computer readable media. The memory 316C of the customer computer 301 can include stored and manipulated data regarding a customer prepaid card account 317. The prepaid card processor 315 is in communication with the financial institution computer server 307 and the plurality of point of sale terminals 313 through an electronic communications network 309. As understood by those skilled in the art, the electronic communication network 309 can be a global communications network like the Internet, World Wide Web, or Web 2.0; a banking type of network; or a retail, customer or intranet type of network.

Embodiments of the present invention include, for example, a retailer-paid subsidy for a customer loan from a bank or other financial institution, as illustrated in FIG. 6. Traditionally, a bank 603 can offer a customer 605 funds from a line of credit 609 in exchange for repayment of the loan and fees 613. In addition, a retailer 607 can offer a customer 605 goods and services 617 in exchange for funds 611. According to embodiments of the present invention, a retailer 607 can also offer to pay loan fees 615 to the bank 603 to facilitate or subsidize the bank 603 offering funds from a line of credit to the customer. Advantageously, payment of the loan fees 615 by the retailer 607 corresponds to a transaction between the customer 605 and the retailer 607. The offer to pay loan fees involves, as understood by those skilled in the art, a line of credit or overdraft product by a bank or financial institution optimized for the retailer.

In an embodiment of a computer-implemented method 100 of advancing funds using a prepaid card to a customer of a retailer, as illustrated in FIG. 1, the computer-implemented method 100 includes establishing from a bank a line of credit for a prepaid card of a customer responsive to customer underwriting data and predetermined qualification parameters, where the line of credit is optimized for a retailer 103. The computer-implemented method 100 also includes determining whether to advance funds through the line of credit for a customer transaction 105 and loading the prepaid card with one or more preselected loan increments of funds for the customer transaction 107 to thereby convert line of credit data into a value associated with a prepaid card so that the value associated with the prepaid card is exchanged for goods. The preselected increments, e.g., $20, for example, can be less than a total available line of credit, e.g., $300, for a customer having an established line of credit with the bank. The computer-implemented method 100 further includes decrementing the total available line of credit, e.g., $300, by the one or more preselected increments, e.g., $20, provided for the customer transaction and a predetermined fee amount, e.g., $2.50 or $0, for each of the one or more preselected increments loaded on the prepaid card 109. The computer-implemented method 100 also includes determining a value of a retailer fee, to be paid by the retailer, having a predetermined amount, e.g., $2, for each of the one or more preselected loan increments loaded on the prepaid card 111. The computer-implemented method 100 can further include, for example, incrementing the total available line of credit by the value of the retailer fee to thereby define a rebate to the customer 113.

Figure 2:
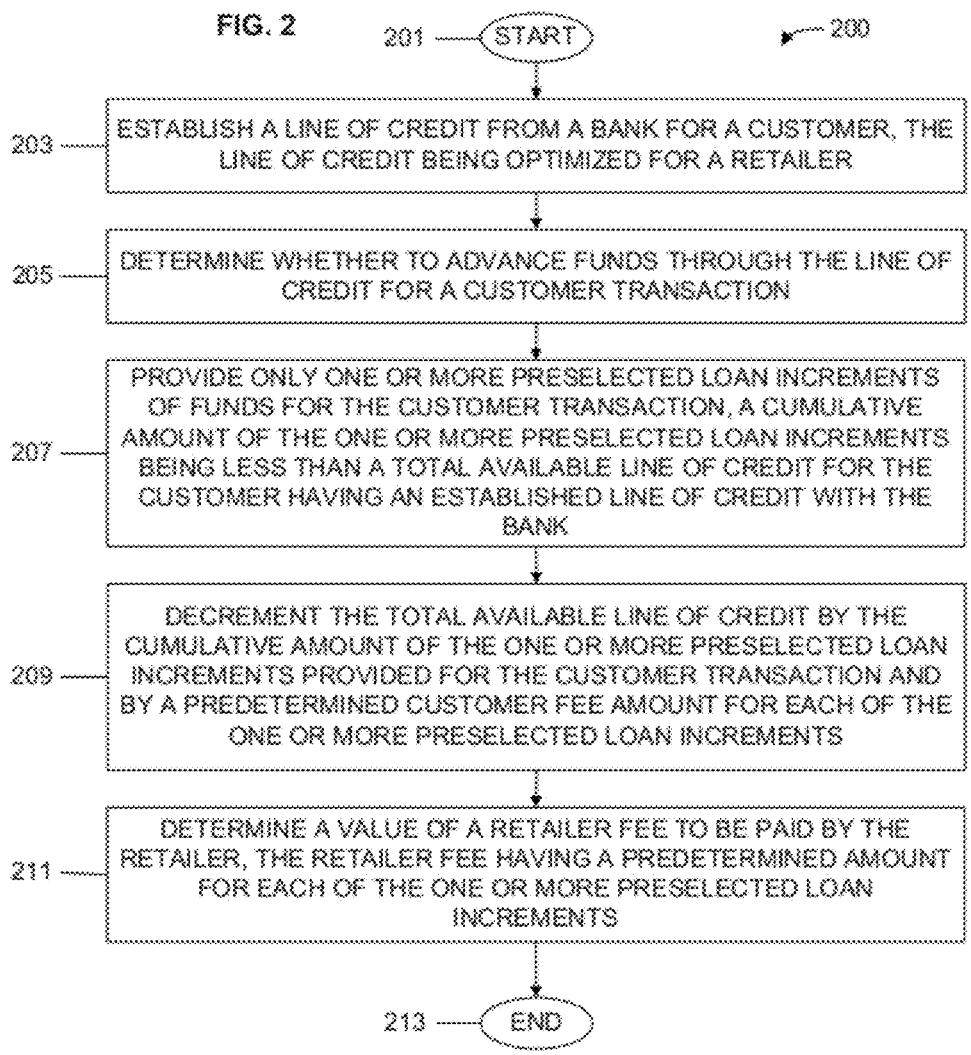
FIG. 2 is a flow diagram of a method of advancing funds to a customer of a retailer according to an embodiment of the present invention.

In an embodiment of a computer-implemented method 200 of advancing funds using a prepaid card to a customer of a retailer, as illustrated in FIG. 2, the computer-implemented method 200 includes establishing from a financial institution, e.g., a bank, a line of credit for a customer responsive to customer underwriting data and predetermined qualification parameters to thereby convert customer underwriting data into line of credit data, where the line of credit is optimized for a retailer 203. The computer-implemented method 200 also includes determining whether to advance funds through the line of credit for a customer transaction 205 and providing only one or more preselected loan increments of hinds for the customer transaction 107 to the customer account to thereby convert line of credit data into a value associated with the customer account to thereby fund the customer transaction. The preselected increments, e.g., $20, for example, can be less than a total available line of credit, e.g., $300, for a customer having an established line of credit with the bank. The computer-implemented method 200 further includes decrementing the total available line of credit, e.g., $300, by the one or more preselected increments, e.g., $20, provided for the customer transaction and a predetermined fee amount, e.g., $2.50 or $0, for each of the one or more preselected increments 209. The computer-implemented method 200 also includes determining a value of a retailer fee, to be paid by the retailer, having a predetermined amount, e.g., $2, for each of the one or more preselected loan increments 211.

Embodiments of the present invention can also include overdraft protection products or programs, with draws based on actual amounts spent or from a line of credit occurring in preselected increments, e.g. $20 increments, with a customer and retailer fee associated with each increment, to satisfy an overdraft of a checking account, deposit account, or other bank account as understood by those skilled in the art. An overdraft protection product can be associated with the first bank offering the line of credit or a second bank that has integrated the product as understood by those skilled in the art.

Figure 4:
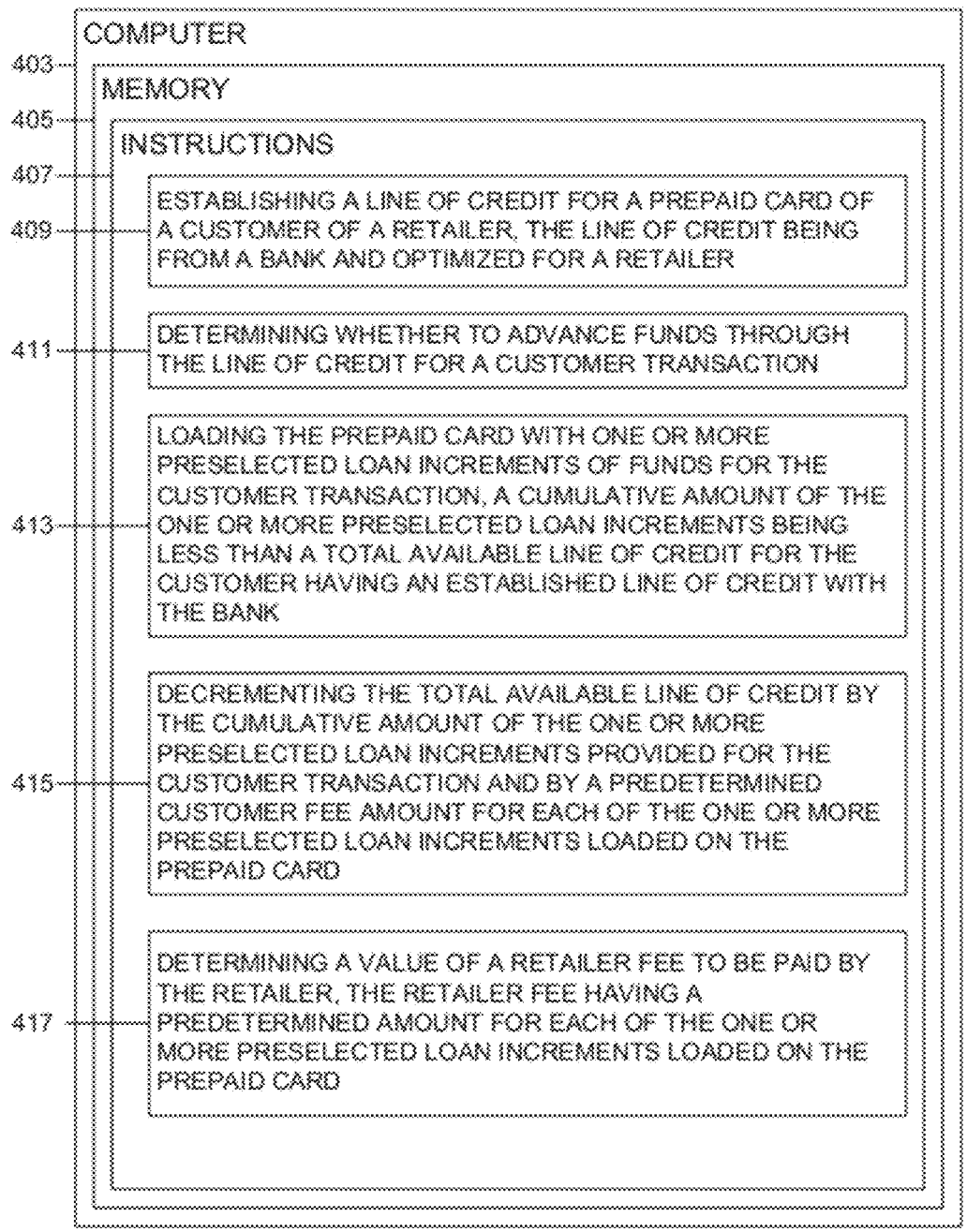
FIG. 4 is a schematic diagram of a computer server having program product stored in memory thereof according to an embodiment of the present invention.

In an embodiment of a program product 401 stored in one or more tangible computer readable media 405 and readable by a computer 403, as illustrated in FIG. 4, for example, the program product 401 can operate to perform the various instructions 407 when read by the computer 403. The program product establishes a retailer-optimized line of credit from a bank for a prepaid card of a customer of a retailer 409 responsive to customer underwriting data and predetermined qualification parameters to thereby convert customer underwriting data into line of credit data. The program product determines whether to advance funds through the line of credit for a customer transaction 411 and then loads the prepaid card with one or more preselected loan increments of funds for the customer transaction to the customer account to thereby convert line of credit data into a value associated with the customer account to thereby fund the customer transaction, the preselected loan increments being less than a total available line of credit with the bank 413. The program product decrements the total available line of credit by the cumulative amount of the one or more preselected loan increments provided for the customer transaction and by a predetermined customer fee amount for each of the one or more preselected loan increments loaded on the prepaid card 415. The program product determines a value of a retailer fee, to be paid by the retailer, having a predetermined amount for each of the one or more preselected loan increments loaded on the prepaid card 417. The program product can further increment the total available line of credit by the value of the retailer fee to thereby define a rebate to the customer.

Figure 5:
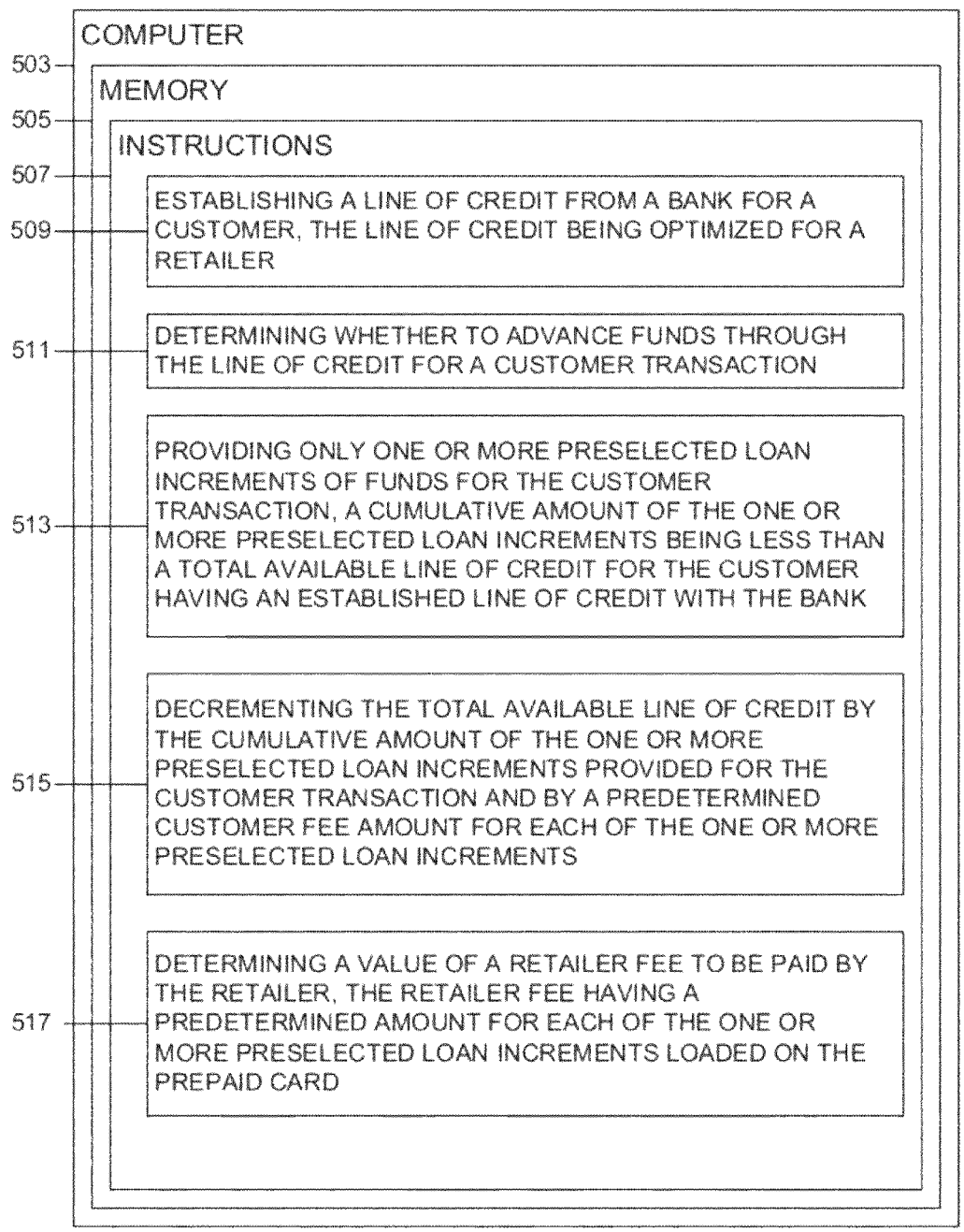
FIG. 5 is a schematic diagram of a computer server having program product stored in memory thereof according to another embodiment of the present invention.

In another embodiment of a program product 501 stored in one or more tangible computer readable media 505 and readable by a computer 503, as illustrated in FIG. 5, for example, the program product 501 can operate to perform instructions 507, such as establishing a retailer-optimized line of credit from a bank for a customer of a retailer 509 responsive to customer underwriting data and predetermined qualification parameters to thereby convert customer underwriting data into line of credit data, determining whether to advance funds through the line of credit for a customer transaction 511, providing only one or more preselected loan increments of funds for the customer transaction to the customer account, the preselected loan increments being less than a total available line of credit with the bank 513, decrementing the total available line of credit by the cumulative amount of the one or more preselected loan increments provided for the customer transaction and by a predetermined customer fee amount for each of the one or more preselected loan increments 515, and determining a value of a retailer fee, to be paid by the retailer, having a predetermined amount for each of the one or more preselected loan increments 517.

A person having ordinary skill in the art will recognize that various types of memory are readable by a computer such as described herein, e.g., bank computer, computer server, financial institution computer, prepaid card processors, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the locations described to store program products, e.g., including software, thereon. Embodiments of a system to advance hinds to a customer, for example, can include a plurality of customer access interface devices as illustrated and described herein and one or more remote computer servers positioned to provide communication with each of the plurality of customer access interface devices and being associated with a financial institution. Each of these computer servers, for example, can having one or more of these various types of memory as understood by those skilled in the art.

Embodiments of the present invention can, for example, include repayment of at least portions of the line of credit responsive to a subsequent direct deposit received for customer's benefit by the bank so that the repayment of the at least portions of the line of credit is deducted from the subsequent direct deposit. That is, loans made under a line of credit can be repaid out of the proceeds of a direct deposit. Recurring direct deposits include, for example, employer payroll funds, federal or state government electronic benefits payments, annuities, dividends, interest payments, lottery winnings, royalty payments, and other streams of payments as understood by one skilled in the art. Repayment embodiments also include decrementing a designated direct deposit from the demand deposit account at a second financial institution, e.g., a second bank, for repayment of at least portions of the line of credit.

Embodiments of systems, program products, and computer-implemented methods of the present invention can include, for example, for substantially all programs if desired, features such as any repayment of draws on the line of credit can be automatically collected from the next electronic deposit regardless of payment source. As payments are received, fees also can be paid first then the payment applied to the oldest outstanding draw amount. When payments are received, total available line limit is restored by the payment amount. If funds from the electronic deposit are not sufficient to cover the outstanding balance, a partial repayment can be made in the full amount of the electronic deposit resulting in an unpaid balance on the line. Repayment of the remaining unpaid balance can be taken from subsequent electronic deposits until the line has been paid in full. Other cash equivalent repayment options also can be accepted and processed by a line of credit processor as understood by those skilled in the art.

It will also be understood by those skilled in the art that embodiments of the line of credit product or program product, for example, can be associated with a payroll processing company that processes direct deposits (see, e.g., FIG. 9). Embodiments of the program product and methods can be added to product or service offerings by the payroll processing company 910 so that it can be offered to their customers independent of bank or product (DDA or payroll card), by taking money or funds out at the source 910, e.g., as the payroll file is prepared 920 and before the direct deposit is even originated, or loaded onto a prepaid card, for example. These embodiments can also allow the processing company 910 to have more direct information on employment history. A payroll processing company 910 can also use a loan processing system 940, loan processor, or other payment processor either within their facilities or as an outsourcing entity to allow the provision of enrolling and providing customer payroll information 924 and for tracking and reconciling repayment or updated customer payroll information with repayments pulled 944. The payroll can be sent, loaded or processed by a payroll processor 930 for ACH transmittal, check generation, or card loading/providing, for example (see, e.g., FIG. 9). These embodiments of associated methods, for example, can include providing a prepaid card to an employee who gets direct deposit to a DDA whereby the consumer borrow funds from the service/product and has those funds direct deposited onto the card instantly and repaid by pulling funds from the direct deposit file prior to sending to the other hank account to repay the amount withdrawn. An example of and more details on how repayment can be accomplished is illustrated in U.S. Provisional Patent Application Ser. No. 61/016,213 titled "Transfer Account Systems, Computer Program Products, and Associated Methods" filed on Dec. 21, 2007 which is incorporated herein by reference in its entirety.

Additionally, along these lines, any repayment of a line supersedes repayment of a negative balance on a card due to force posts or settlement transactions that cause the card to go negative. Any monies remaining after a payment is received can be credited to the prepaid card account. If payment takes the card balance to $0, any transactions attempted with the card can be declined. Those transactions can be subject to any related decline fees. Repayment of a draw, for example, should not be taken from the principal balance on a card. That is, if a card balance is positive prior to a draw, only when the next electronic deposit is initiated to the card will repayment be triggered. If a draw is not paid within the preselected time period, preferably days, e.g., 35 day timeframe, any amount owed can be taken from the principal balance on a card.

Figure 10:
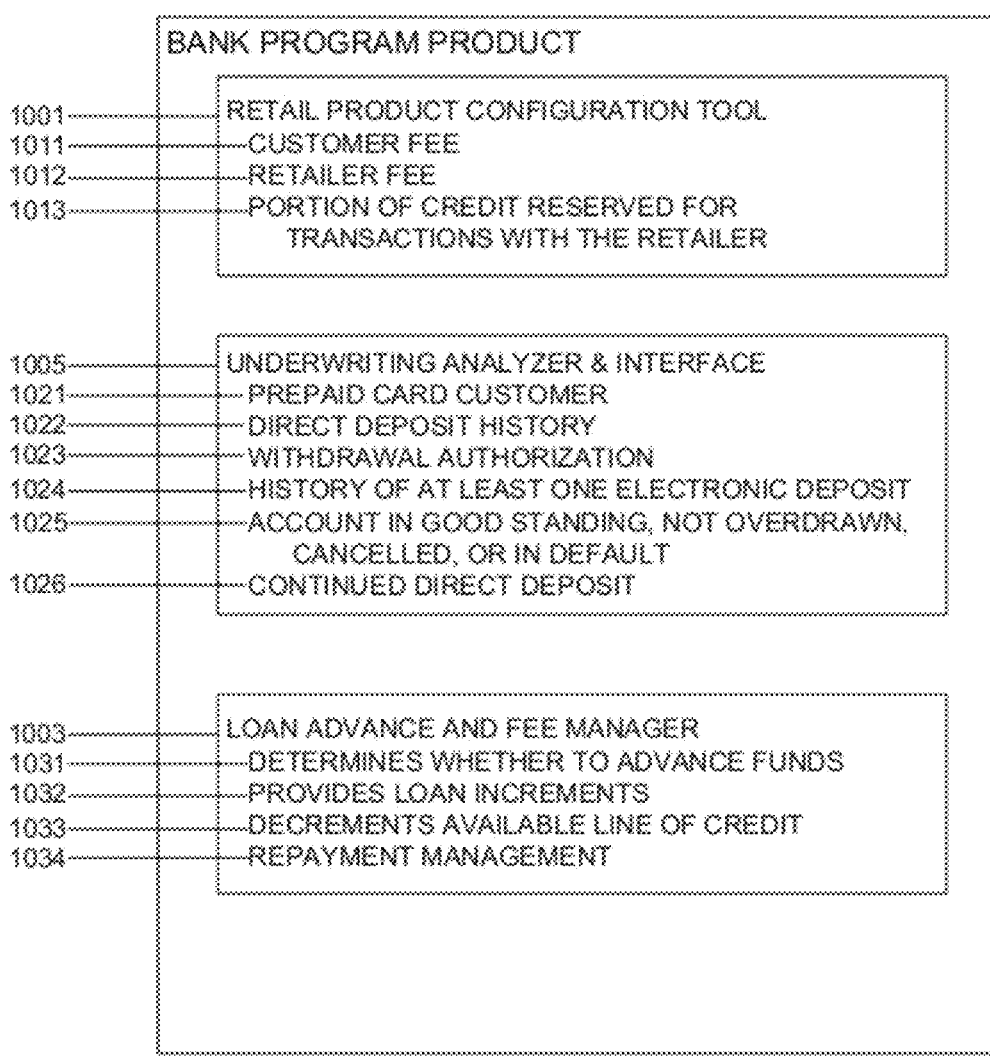
FIG. 10 is a schematic diagram of a program product according to an embodiment of the present invention.

Embodiments of the present invention provide, for example, a program product 1000 associated with a bank or other financial or lending institution implemented in modules or components, as illustrated in FIG. 10. A retail product configuration tool 1001 can, for example, define, adjust, and analyze the predetermined customer fee 1011, the predetermined retailer fee 1012, the portion of credit reserved for transactions with the retailer 1013, and other features, characteristics, and parameters of a line of credit optimized for a retailer. Retail configuration tool 1001 embodiments advantageously allow the customization of a product line for each retailer, promotion, or season as understood by those skilled in the art. An underwriting analyzer and interface component 1005 of a bank program product 1000 can receive underwriting information, e.g., data, and make the determine whether to offer a line of credit or other product to the customer as understood by those skilled in the art. Underwriting data can include whether a customer is an existing prepaid card customer 1021; a direct deposit history 1022; a withdrawal authorization or approval 1023, from an enrollment in a line of credit program; a history of at least one electronic deposit 1024; an account being in good standing, not overdrawn, cancelled, or in default 1025; continued direct deposit 1026; and other data as understood by those skilled in the art. In addition, a loan advance and fee manager module 1003 deals with determining whether to advance funds 1031, providing loans in increments 1032, calculating available credit 1033, managing repayments 1034, and other associated tasks as understood by those skilled in the art. Other architectures and organizations will be understood by those skilled in the art to be included within the embodiments of the present invention. Program products can be implemented in a variety of software and programming languages, including without limitation hypertext markup language ("HTML"), Java, C, C++, XML, and others as understood by those skilled in the art.

Figure 3:
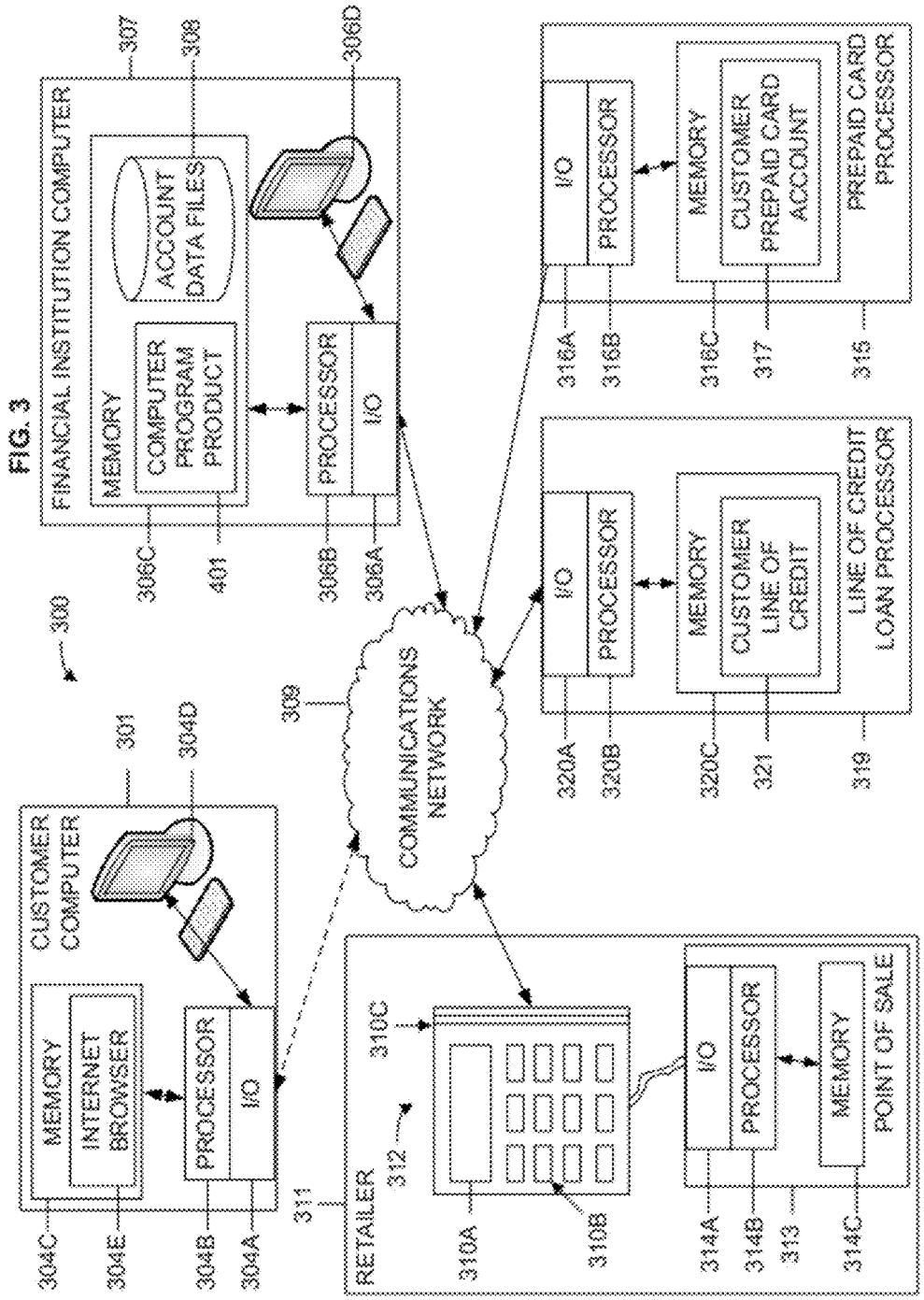
FIG. 3 is a schematic diagram of a system to advance funds to a customer of a retailer according to an embodiment of the present invention.
Figures 11A, 11B:
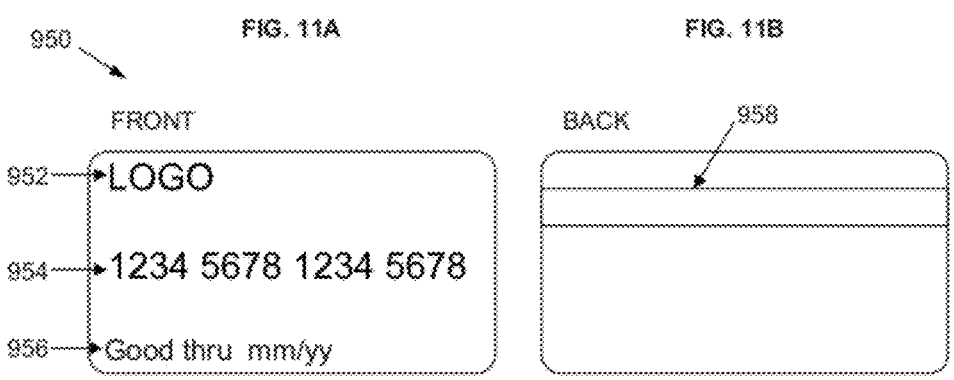
FIGS. 11A and 11B are respective front and back plan views of a prepaid card according to an embodiment of the present invention.

As illustrated in FIGS. 11A, 11B, and 3, embodiments of the present invention can include, for example, a card 950, e.g., a prepaid card, and a card reader device 312, associated with a point of sale terminal 313. As understood by those skilled in the art, a card 950, e.g., a prepaid card, can have indicia 952, e.g., logos, slogans, source identifiers, of a financial institution, i.e., a sponsoring bank and of a prepaid card processor; a serial number 954; and expiration date 956. The structures of various types of specific cards, e.g., magnetic stripe 958, type of material, are well known to those skilled in the art and can be used with embodiments of the present invention. Typically, a card 950 is formed from plastic and has a magnetic stripe 958 affixed to the plastic through an application of heat. Those skilled in the art will understand that other embodiments besides a magnetic stripe can include radio frequency identification devices (RFID), smart chips, bar codes, and other similar devices. Embodiments of the present invention can include forming cards or receiving cards already formed. The magnetic stripe card 950 can store information, or data, e.g., account information, by modifying the magnetism of particles on the magnetic stripe 958 on the card. The information can be read by swiping the card through a slot 310C past a reading head of a card reader device 312. The card reader device 312 and associated point of sale terminal 313 can include a display 310A and input/output (I/O) devices 310B, e.g., a keypad. Typically, there are two tracks of information on a magnetic card 950 used for financial transactions, known as tracks 1 and 2. In addition, a third track, known as track 3, can be available for magnetic stripe cards. Tracks 1 and 3, if available, are typically recorded at 210 bits per inch, while track 2 typically has a recording density of 75 bits per inch, Track 2, as typically encoded, was developed by the American Bankers Association (ABA) provides for 37 numeric data characters, including up to 19 digits for a primary account number (including a Bank identification Number as understood by those skilled in the art), an expiration date, a service code, and discretionary verification data, such as, a Personal Identification Number, or PIN. The information, e.g., data, on the card can be used, for example, to facilitate a transaction. For example, when the card 950 is swiped through a slot 310C, the data on the magnetic stripe 958 is read and processed by the point of sale terminal 312, converting data stored in the magnetic particles on the card into data associated with readers 312 and a financial institution computer 307. The card reader 312 and associated point of sale terminal 313 can then communicate through an electronic communications network 309 to, for example, a prepaid card processor 315 or a financial institution computer 307. The card reader 312 communicates the account information, e.g.; data, as read from the card, as well as other data, such as, an amount of a proposed transaction for approval from the point of sale terminal 313. The other data, for example, can be entered by merchant personnel (e.g., an amount of the transaction), the consumer (e.g., a PIN, or security code), or bank personnel (e.g., a security approval). The prepaid card processor 315 or a financial institution computer 307 can then utilize the account information and other data to authorize or reject a purchase by, for example, determining whether a proposed purchase by the consumer is less than an amount of funds remaining on the card. Moreover, optional security measures, including, for example, a mismatch between a PIN supplied by the consumer and a PIN stored on the card or in a database, can result in the rejection of a proposed transaction. The prepaid card processor 315 or financial institution computer 307 then perform certain functions, including responding to the authorization request so that a point of sale displays an indication of approval or rejection, resulting in a visual depiction to a merchant of the approval or rejection of the proposed transaction. Also, prepaid card processor 315 can, for example, write data to a database to record a purchase or other transaction (including advancing a loan from the line of credit), to debit available funds from an account associated with the prepaid card 950, and to credit directly or indirectly a merchant for a purchase. In addition to purchase authorization, embodiments of the present invention also can include customer inquiries into recent transactions or a balance inquiry, i.e., an amount of remaining value associated with the prepaid card.

As illustrated in FIG. 12, embodiments of the present invention include, for example, providing data associated with a customer account having an attached line of credit as a visual representation of account activity. For example, a customer computer 301, through an Internet Browser 304E, (see FIG. 3) can display on a display device 304D an account activity statement 712 for a customer-specific account 713, or set of accounts, with each transaction including, for example, a date 714A, a description 714B, a amount credited to the account 714C, an amount debited from the account 714D, a resulting card balance 714E, a line of credit amount available 714F, and a line of credit outstanding balance 714G, or other such data as understood by those skilled in the art. For example, the visual representation can include a card balance inquiry 715A. For example, the visual representation can include advancing funds in one or more preselected loan increments for the customer transaction and decrementing the total available line of credit by the cumulative amount of the one or more preselected loan increments provided for the customer transaction and by a predetermined customer fee amount for each of the one or more preselected loan increments 715B. For example, the visual representation can include a purchase of goods 715C, wherein data associated with a prepaid card representing an amount of value associated with a line of credit is modified in an exchange for products, including goods or services. For example, the visual representation can include incrementing the total available line of credit by the value of a retailer fee to thereby define a rebate to the customer 715D. In addition, the visual representation can include a direct deposit 715E and also a loan repayment from direct deposit funds relatively instantaneously (or prior to) with the direct deposit funds being made available in the consumer's account 715F. Also, the visual representation can include an adjustment to the total loan value responsive to consumer performance data 715G. In other embodiments, advancing the loan increments 715B and an associated purchase of goods 715C can be represented as a single transaction; likewise, the direct deposit 715E and an associated loan repayment 715F can be represented as a single transaction.

This application is a continuation of and claims priority and the benefit to U.S. patent application Ser. No. 13/349,423, by Ahlers et. al, titled "System, Non-transitory Memory with Computer Program and Associated Methods for Micro-Credit to Prepaid Card, filed on Jan. 12, 2012, which is a continuation of and claims priority and the benefit to U.S. patent application Ser. No. 13/233,268, by Ahlers et al., titled "System, Program Product, and Associated Methods to Autodraw for Micro-Credit Attached to a Prepaid Card" filed on Sep. 15, 2011, which claims priority to and the benefit of U.S. patent application Ser. No. 12/417,199, by Ahlers et al., titled "System, Program Product, and Associated Methods to Autodraw for Micro-Credit Attached to a Prepaid Card" filed on Apr. 2, 2009, which claims priority to and the benefit to U.S. Provisional Patent Application Ser. No. 61/042,612, by Ahlers et al., titled "System, Program Product, and Associated Methods to Autodraw for Micro-Credit Attached to a Prepaid Card" filed on Apr. 4, 2008, and U.S. Provisional Patent Application Ser. No. 61/042,624, by Crowe et al., titled "System, Program Product, and Method to Authorize Draw for Retailer Optimization" filed on Apr. 4, 2008, all of which are incorporated herein by reference in their entireties.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

The invention claimed is:

1. A computer to allow a plurality of customers to access a plurality of line of credits associated with a plurality of customer accounts, the computer comprising:

one or more processors to allow a plurality of customers to access a plurality of line of credits accounts associated with a financial institution;

one or more input/output unit adapted to communicate with an electronic communications network; and non-transitory computer-readable medium encoded with computer program that when executed by the one or more processors, perform the operations of:

establishing, responsive to customer underwriting data and predetermined qualification parameters, the plurality of line of credit accounts associated with a plurality of customer accounts for a plurality of customers, the plurality of line of credit accounts having a plurality of total credit limits having a first portion and a second portion, the first portion of the plurality of total credit limits being reserved for use with one or more transactions with a predetermined retailer, each of the plurality of line of credit accounts further being adapted to be drawn in at least one of a plurality of separate predetermined loan increments each being equal in value;

determining a number of separate predetermined loan increments to be added to the one or more of the plurality of customer accounts responsive to a determination to advance funds from the one or more of the plurality of line of credit accounts for one or more customer transactions;

loading the one or more of the plurality of customer accounts with at least one of the plurality of separate predetermined loan increments that corresponds with the determined number of separate predetermined loan increments to thereby define loaded predetermined increments, the loaded predetermined increments not exceeding a line of credit balance available for the one or more of the plurality of line of credit accounts; and determining a loan advance fee for the loaded predetermined increments, the loan advance fee being equal to a predetermined financial institution fee plus a predetermined retailer fee multiplied by the number of separate predetermined loan increments.

2. A computer as defined in claim 1, wherein determining whether to advance funds from the one or more of the plurality of line of credit accounts includes: determining, responsive to receipt of transaction data, when one or more customer transaction cards associated with the one or more of the plurality of customer accounts is being used as payment for one or more customer transactions and when a value of the one or more customer transactions is greater than a value associated with the one or more of the plurality of customer accounts.

3. A computer as defined in claim 1, wherein the total value of the predetermined loan advance fee is a first amount when the one or more customer transactions is with the predetermined retailer and a second amount when the one or more customer transactions is not with the predetermined retailer, the second amount being larger than the first amount so that advances from the one or more of the plurality of line of credit accounts for one or more customer transactions with the predetermined retailer are provided at a discount.

4. A computer as defined in claim 1, wherein the computer program further comprises the instructions of:

deducting the loaded predetermined increments and the total value of the predetermined loan advance fee from a line of credit balance available associated with the one or more of the plurality of line of credit accounts; and decreasing a line of credit balance associated with the one or more of the plurality of line of credit accounts by at least the predetermined retailer fee to thereby provide a rebate to one or more of the plurality of customers.

5. A computer as defined in claim 1, wherein determining whether to advance funds from the one or more of the plurality of line of credit accounts is responsive to a request to draw funds from the one or more of the plurality of line of credit accounts using an interactive voice response unit; and wherein the financial institution is a first financial institution and one or more of the plurality of customer accounts are managed by a second financial institution different and positioned remote from the first financial institution.

6. A computer as defined in claim 1, wherein the predetermined retailer fee is paid by the predetermined retailer when the loaded predetermined increments are used for the one or more customer transactions with the predetermined retailer.

7. A computer as defined in claim 2, wherein the determined number of separate predetermined loan increments multiplied by a value of one of the plurality of separate predetermined loan increments plus the value associated with the one or more of the plurality of customer accounts exceeds the value of the one or more customer transactions by less than the value of one of the plurality of separate predetermined loan increments.

8. Non-transitory computer-readable medium encoded with computer program operable on a computer to allow a plurality of customers to access a plurality of line of credits associated with a plurality of customer accounts, the computer program when executed by the computer, perform the operations of:

establishing, by the computer associated with a financial institution to define a financial institution computer, responsive to customer underwriting data and predetermined qualification parameters, a plurality of line of credit accounts associated with a plurality of customer accounts for a plurality of customers, the plurality of line of credit accounts having a plurality of total credit limits and adapted to be drawn in at least one of a plurality of separate predetermined loan increments each being equal in value;

determining, by the financial institution computer, a number of separate predetermined loan increments to be added to the one or more of the plurality of customer accounts responsive to a determination to advance funds from one or more of the plurality of line of credit accounts for the one or more customer transactions;

loading, by the financial institution computer, the one or more of the plurality of customer accounts with at least one of the plurality of separate predetermined loan increments that corresponds with the determined number of separate predetermined loan increments to thereby define loaded predetermined increments, when the loaded predetermined increments not exceeding a line of credit balance available for the one or more of the plurality of line of credit accounts; and determining, by the financial institution computer, a loan advance fee for the loaded predetermined increments, the loan advance fee being equal to a predetermined financial institution fee plus a predetermined retailer fee multiplied by the number of separate predetermined loan increments.

9. Non-transitory computer-readable medium as defined in claim 8, wherein determining whether to advance funds from the one or more of the plurality of line of credit accounts includes: determining, responsive to receipt of transaction data, when one or more customer transaction cards associated with the one or more of the plurality of customer accounts is being used as payment for one or more customer transactions and when a value of the one or more customer transactions is greater than a value associated with the one or more of the plurality of customer accounts.

10. Non-transitory computer-readable medium as defined in claim 8, wherein the plurality of total credit limits of the plurality of line of credit accounts have a first portion and a second portion; and wherein the predetermined retailer fee being a first amount when the one or more customer transactions is with a predetermined retailer and a second amount when the one or more customer transactions is not with the predetermined retailer, the second amount being larger than the first amount so that advances from the one or more of the plurality of line of credit accounts for one or more customer transactions with the predetermined retailer are provided at a discount.

11. Non-transitory computer-readable medium as defined in claim 8, wherein the computer program further comprises the instructions of:

deducting the loaded predetermined increments and the total value of the predetermined loan advance fee from a line of credit balance available associated with the one or more of the plurality of line of credit accounts; and decreasing a line of credit balance associated with the one or more of the plurality of line of credit accounts by at least the predetermined retailer fee to thereby provide a rebate to one or more of the plurality of customers.

12. Non-transitory computer-readable medium as defined in claim 8, wherein determining whether to advance funds from the one or more of the plurality of line of credit accounts is responsive to a request to draw funds from the one or more of the plurality of line of credit accounts.

13. Non-transitory computer-readable medium defined in claim 8, wherein the predetermined retailer fee is paid by the predetermined retailer when the loaded predetermined increments are used for the one or more customer transactions with the predetermined retailer.

14. Non-transitory computer-readable medium as defined in claim 9, wherein the determined number of separate predetermined loan increments multiplied by a value of one of the plurality of separate predetermined loan increments plus the value associated with the one or more of the plurality of customer accounts exceeds the value of the one or more customer transactions by less than the value of one of the plurality of separate predetermined loan increments.

15. A computer-implemented method to allow a plurality of customer to access a plurality of line of credits, the computer-implemented method comprising:

establishing, by a computer associated with a financial institution and defining a financial institution computer, a plurality of line of credit accounts associated for a plurality of customers, the plurality of line of credit accounts having a plurality of total credit limits and adapted to be drawn in at least one of a plurality of separate predetermined loan increments each being equal in value;

determining, by the financial institution computer, a number of separate predetermined loan increments to be added to the one or more of the plurality of customer accounts responsive to a determination to advance funds from one or more of the plurality of line of credit accounts for the one or more customer transactions;

loading, by the financial institution computer, the one or more of the plurality of customer accounts with at least one of the plurality of separate predetermined loan increments that corresponds with the determined number of separate predetermined loan increments to thereby define loaded predetermined increments, the loaded predetermined increments not exceeding a line of credit balance available for the one or more of the plurality of line of credit accounts; and determining, by the financial institution computer, a loan advance fee for the loaded predetermined increments, the loan advance fee being equal to a predetermined financial institution fee plus a predetermined retailer fee multiplied by the number of separate predetermined loan increments.

16. A computer-implemented method as defined in claim 15, wherein determining whether to advance funds from the one or more of the plurality of line of credit accounts includes: determining, by the financial institution computer, responsive to receipt of transaction data by the financial institution computer, when one or more customer transaction cards associated with the one or more of the plurality of line of credit accounts is being used as payment for one or more customer transactions.

17. A computer-implemented method as defined in claim 15, wherein the plurality of total credit limits of the plurality of line of credit accounts have a first portion and a second portion, the first portion being larger than the second portion and reserved for use with one or more transactions with the predetermined retailer; and wherein the predetermined retailer fee being a first amount when the one or more customer transactions is with the predetermined retailer and a second amount when the one or more customer transactions is not with the predetermined retailer, the second amount being larger than the first amount so that advances from the one or more of the plurality of line of credit accounts for one or more customer transactions with the predetermined retailer are provided at a discount.

18. A computer-implemented method as defined in claim 15, wherein determining whether to advance funds from the one or more of the plurality of line of credit accounts is responsive to a request to draw funds from the one or more of the plurality of line of credit accounts.

19. A computer-implemented method as defined in claim 15, wherein the predetermined retailer fee is paid by the predetermined retailer when the loaded predetermined increments are used for the one or more customer transactions with the predetermined retailer.

20. A computer-implemented method as defined in claim 16, wherein the determined number of separate predetermined loan increments multiplied by a value of one of the plurality of separate predetermined loan increments plus the value associated with the one or more of the plurality of customer accounts exceeds the value of the one or more customer transactions by less than the value of one of the plurality of separate predetermined loan increments.

* * * * *